(12) United States Patent
Bablani et al.

(10) Patent No.: US 12,073,297 B2
(45) Date of Patent: Aug. 27, 2024

(54) SYSTEM PERFORMANCE OPTIMIZATION

(71) Applicant: ACCENTURE GLOBAL SOLUTIONS LIMITED, Dublin (IE)

(72) Inventors: Kamal Bablani, Winnersh (GB); Jayanthi Mohanram, Bangalore (IN); Deepika Bhaskar, Bangalore (IN); Abhishek Sharma, Delhi (IN); Baljit Malhotra, Gurgaon (IN); Ankit Khurana, Delhi (IN); Priyanka Niranjan, Jhansi (IN); Supriya Sahoo, Rourkela (IN); Ragavendran Ramesh, Harur (IN)

(73) Assignee: ACCENTURE GLOBAL SOLUTIONS LIMITED, Dublin (IE)

(*) Notice: Subject to any disclaimer, the term of this patent is extended or adjusted under 35 U.S.C. 154(b) by 912 days.

(21) Appl. No.: 17/136,925

(22) Filed: Dec. 29, 2020

(65) Prior Publication Data
US 2022/0207414 A1    Jun. 30, 2022

(51) Int. Cl.
| | |
|---|---|
| G06N 20/00 | (2019.01) |
| G06F 8/77 | (2018.01) |
| G06F 18/21 | (2023.01) |
| G06F 18/214 | (2023.01) |

(52) U.S. Cl.
CPC ........... G06N 20/00 (2019.01); G06F 8/77 (2013.01); G06F 18/214 (2023.01); G06F 18/217 (2023.01)

(58) Field of Classification Search
CPC .................................................. G06N 20/00
See application file for complete search history.

(56) References Cited

U.S. PATENT DOCUMENTS

2018/0302291 A1* 10/2018 Srinivasan .......... G06F 9/45558
2019/0260764 A1    8/2019 Humphrey et al.

OTHER PUBLICATIONS

Thein, Thandar, et al. "Reinforcement learning based methodology for energy-efficient resource allocation in cloud data centers." Journal of King Saud University—Computer and Information Sciences 32.10 (2020): 1127-1139. (Year: 2020).*
Tkaczyk, Dominika. "New methods for metadata extraction from scientific literature." arXiv preprint arXiv:1710.10201 (2017). (Year: 2017).*

* cited by examiner

*Primary Examiner* — Eric Nilsson
(74) *Attorney, Agent, or Firm* — Mannava & Kang, P.C.

(57) ABSTRACT

A system for providing performance optimization for a software solution may scan multiple predefined levels of the software solution to extract corresponding metadata information from each of the multiple predefined levels. The system may store the extracted corresponding metadata information pertaining to standard parameters associated with performance of the software solution. The system may determine a standard score based on a plurality of attributes of the extracted corresponding metadata information, optimize the determined standard score based on training data received from a learning model, and generate an insight information comprising information related to determined rule violations and of evaluation steps involved in determining the determined standard score.

18 Claims, 15 Drawing Sheets

SYSTEM PERFORMANCE OPTIMIZATION

BACKGROUND

Information technology (IT) is present in practically every field, process, and system in the world. IT requires a large amount of energy and other resources. Currently, at least 2% of global carbon emissions are directly due to IT systems and the amount of emissions is expected to rise in the coming times because new IT solutions are implemented every day. The need to reduce IT energy requirements and carbon emissions has been felt all over the world. Because the use of IT products, applications, services, and practices includes various types of computing, emphasis has been primarily on minimizing power usage and reducing computation time and processing power needed for computation machines, datacenters, software programs and other technical equipment.

In addition, with huge dependence on the IT in everyday applications, complexity of programs and computer instructions generated has increased exponentially. Moreover, users and/or clients of programs and generated computer instructions are unaware of carbon emissions occurring due to extensive dependence on and execution of these programs and computer instructions and their usage impact on the environment.

Accordingly, there is a requirement to provide an architecture that facilitates determination of carbon emission levels occurring during execution of programs and computer instructions while comparing its performance with a standard score so as to improve system performance optimization. Additionally, there is a requirement to provide insight information related to rule violations occurring during execution of the IT programs and the computer instructions leading to increased carbon emissions.

SUMMARY

An embodiment of present disclosure includes a system including a processor, a data extractor, a data lake, and a data analyzer. The data extractor may scan multiple predefined levels of a software solution such as, for example, an Enterprise Resource Planning (ERP) solution (the terms software solution and the ERP solution are used interchangeably herein hereafter) to extract corresponding metadata information from each of the multiple predefined levels, the multiple predefined levels comprising an inventory level, a code level, an application level, an automation level, and a data archiving level. The data lake may store the extracted corresponding metadata information, the metadata information pertaining to one or more of standard parameters associated with performance of the software solution. The data analyzer may determine a standard score based on a plurality of attributes of the extracted corresponding metadata information, the plurality of attributes pertaining to weight, severity and violation count of each of the one or more of standard parameters. The data analyzer may optimize the determined standard score based on training data received from a learning model. The training data may pertain to pre-determined rule violations and the determined standard score. The data analyzer may generate an insight information comprising information related to determined rule violations and one or more of evaluation steps involved in determining the standard score.

Another embodiment of the present disclosure may include a method for scanning, by the processor, multiple predefined levels of a software solution to extract corresponding metadata information from each of the multiple predefined levels, the multiple predefined levels comprising an inventory level, a code level, an application level, an automation level, and a data archiving level. The method may include storing, by the processor, the extracted corresponding metadata information, the metadata information pertaining to one or more of standard parameters associated with performance of the software solution. The standard score may be determined, by the processor, based on a plurality of attributes of the extracted corresponding metadata information, the plurality of attributes pertaining to weight, severity and violation count of each of the one or more of standard parameters. Further, the method may also include optimizing, by the processor, the determined standard score based on training data received from a learning model, the training data pertaining to pre-determined rule violations and the determined standard score. Further, the method may include generating, by the processor, an insight information comprising information related to determined rule violations and one or more of evaluation steps involved in determining the standard score.

Yet another embodiment of the present disclosure may include a non-transitory computer readable medium comprising machine executable instructions that may be executable by a processor to scan multiple predefined levels of a software solution to extract corresponding metadata information from each of the multiple predefined levels, the multiple predefined levels comprising an inventory level, a code level, an application level, an automation level, and a data archiving level; store the extracted corresponding metadata information, the metadata information pertaining to one or more of standard parameters associated with performance of the software solution; determine a standard score based on a plurality of attributes of the extracted corresponding metadata information, the plurality of attributes pertaining to weight, severity and violation count of each of the one or more of standard parameters; optimize the determined standard score based on training data received from a learning model, the training data pertaining to pre-determined rule violations and the determined standard score; and generate an insight information comprising information related to determined rule violations and one or more of evaluation steps involved in determining the determined standard score.

DETAILED DESCRIPTION

Figure 1:
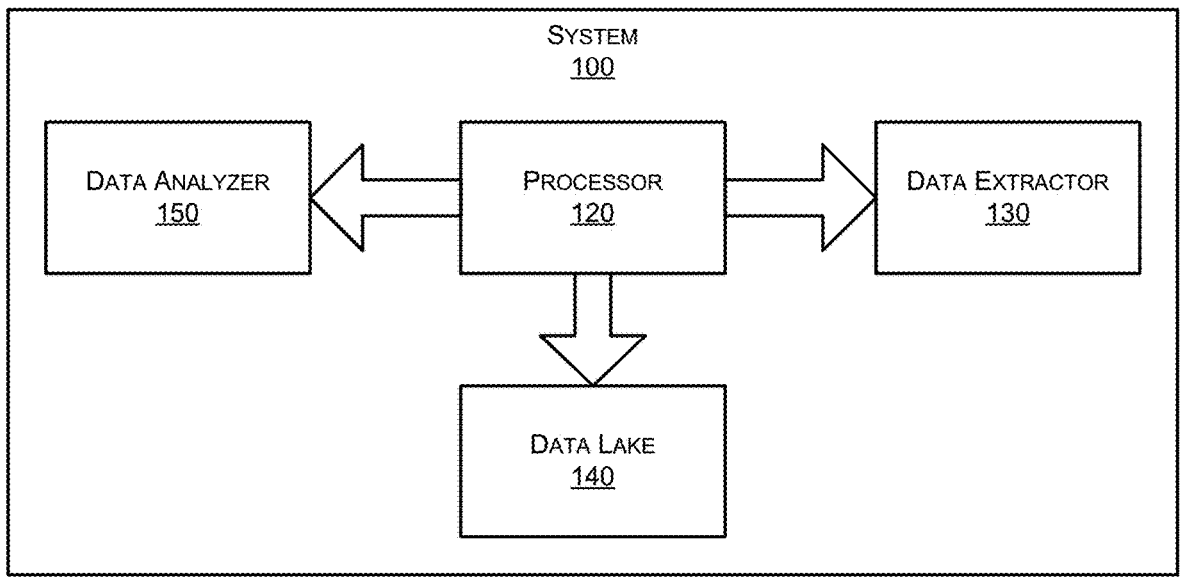
FIG. 1 illustrates a system for software solution performance optimization, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the terms "a" and "an" are intended to denote at least one of a particular element. The terms "a" and "an" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to. The term "relevant" means closely connected or appropriate to what is being done or considered.

Various embodiments describe providing a sustainable and efficient Enterprise Resource Planning (ERP) solution performance optimization in current digital era due to increased energy consumptions and carbon e.g., CO2 emissions. In an example, the embodiments may be implemented using a system including a data extractor, a data lake, and a data analyzer. The data extractor may scan multiple pre-defined levels of the ERP solution to extract corresponding metadata information from each of the multiple predefined levels. The multiple predefined levels may include an inventory level, a code level, an application level, an automation level, and a data archiving level. The data lake may store the extracted corresponding metadata information. The metadata information may pertain to a plurality of standard parameters that may be associated with performance of the ERP solution.

Further, the data analyzer may determine a standard score based on a plurality of attributes of the extracted corresponding metadata information. The plurality of attributes may pertain to weight, severity, and violation count of each of the plurality of standard parameters. The data analyzer may optimize the determined standard score based on training data received from a learning model. The training data may pertain to pre-determined rule violations and the determined standard score. Furthermore, the data analyzer may generate an insight information including information related to determined rule violations and plurality of evaluation steps involved in determining the determined standard score.

The data lake may store a plurality of extraction results obtained from the data extractor. The plurality of extraction results comprises the determined standard score and real time metrics for determining a set of successful rules and a set of violation rules. The data analyzer may include a calculation engine, a predictive engine, and an analytical engine. The calculation engine may evaluate the extracted corresponding metadata information and perform calculations for determination of a standard score corresponding to a standard rule pertaining to the performance of the ERP solution. The calculation engine may assign a severity score to the determined at least one of the standard rule based on a predefined impact of the determined at least one of the standard rule. In an embodiment, the calculation engine may determine the standard score using a sigmoid function. The plurality of attributes pertaining to the weight, the severity, and the violation count of each of the plurality of standard parameters may be provided as input to the sigmoid function.

The present disclosure describes a system for optimizing an ERP solution performance. The performance is optimized based on key critical metrics such as quality, productivity/efficiency, maintainability, automation, application sustainability, and the like. For optimizing the performance, a mechanism for scanning the ERP solution is provided which searches for various metadata information present within the ERP. Further, associated data for matching patterns may be fed into the data lake by leveraging the extraction engine that comprises of various extractor utilities and facilitate to investigate the ERP solution as per client requirements. The extractors may be deployed on a client's system as a SaaS (Software as a service) for determining performance of multiple parameters related to applications and/or software programs executing within the ERP solution. Also, the performance of multiple parameters may be determined and extracted using an input entry sheet where a client associated with the ERP solution may provide requisite input information and where the input entry sheet may have data available in a prescribed format so as to capture the standard score.

Embodiments in the present disclosure are described in the context of optimizing performance of the ERP solution being used not only in IT organizations but in majority of all the corporations for managing their financial, HR, sales, marketing, manufacturing, or supply chain operations. However, it will be appreciated that the embodiments and concepts described herein may be applied in other scenarios, for example, in various solutions provided by the IT organizations other than ERP solution. The system may implement IT solutions using various IT programming practices in the organization's IT eco system to determine the performance optimizations and standard score relevance.

FIG. 1 illustrates a system 100 for optimizing an ERP solution performance, according to an embodiment of the present disclosure. The system 100 may be implemented by way of a single device or a combination of multiple devices that are operatively connected or networked together. The system 100 may be implemented in hardware or a suitable combination of hardware and software. As illustrated, the system 100 may be a hardware device including a processor 120 executing machine readable program instructions to (1) scan and extract metadata information from each of multiple predefined levels of the ERP solution, (2) evaluate the extracted corresponding metadata information and perform calculations for determination of a standard score corresponding to a standard rule pertaining to the performance of the ERP solution, (3) determine the standard score using a sigmoid function, where the plurality of attributes pertaining to the weight, the severity and the violation count of each of the plurality of standard parameters are provided as input to the sigmoid function, (4) assign a severity score to the determined standard rule based on a predefined impact of the determined standard rule, (5) store the extracted metadata information pertaining to plurality of standard parameters associated with performance of the ERP solution in a data lake, (6) determine a standard score based on a plurality of attributes of the extracted corresponding metadata information. The plurality of attributes may pertain to weight, severity and violation count of each of the plurality of standard parameters, (7) optimize the determined standard score based on training data received from a learning model. The training data may relate to pre-determined rule violations and the determined standard score. The learning model may be an Artificial Intelligent (AI) based reinforcement (RL) model that uses an optimization technique to optimize the determined standard score and predicts reductions to the determined rule violations.

The "hardware" may comprise a combination of discrete components, an integrated circuit, an application-specific integrated circuit, a field programmable gate array, a digital signal processor, or other suitable hardware. The "software" may comprise one or more objects, agents, threads, lines of code, subroutines, separate software applications, two or more lines of code or other suitable software structures operating in one or more software applications or on one or more processors. The processor 120 may include, for example, microprocessors, microcomputers, microcontrollers, digital signal processors, central processing units, state machines, logic circuits, and/or any devices that manipulate data or signals based on operational instructions. Among other capabilities, the processor 120 may fetch and execute computer-readable instructions in a memory operationally coupled with the system 100 for performing tasks such as signal coding, data processing input/output processing, power control, and/or any other functions. Any reference to a task in the present disclosure may refer to an operation being or that may be performed on data.

In an example, the processor 120 may be coupled to a data extractor 130, a data lake 140, and a data analyzer 150.

The data extractor 130 may comprise an extraction engine and may correspond to extracting metadata information at various predefined levels of the ERP solution using extractor utilities of the extraction engine. The predefined levels may include an inventory level, a code level, an application level, an automation level, and a data archiving level.

The data lake 140 may act as a central repository and may correspond to storing all of the scanned and extracted metadata information received from the extraction engine. The stored metadata information may be consumed by available intelligent engines for further processing. Further, the data lake 140 may store extraction results that may include a calculated standard score, rules that may have been executed successfully, and rules that may not have been executed successfully. The executed successful and unsuccessful rules may be obtained on scanning and comparing against standard rules. Further, the calculated standard score, the successful rules and the unsuccessful rules may be used as training data for an Artificial Intelligence (AI) engine.

Multiple standard parameters associated with performance of the ERP solution may enrich the data lake 140 that is used as a base for extracting business intelligence and analytics insights by performing historical data comparison based on industry best practices. The data lake 140 may store Advanced Business Application Programming (ABAP) artifacts, functional artifacts, master data, incomplete business documents, and existing errors. Further, best application programming practices as per business requirement that are critical for performance optimizations, optimization potentials for existing functionalities and custom code, automation possibilities of repetitive manual tasks, and data archiving recommendations related to data and content management opportunities may be stored in the data lake 140.

The data analyzer 150 may correspond to providing intelligent insights and analytics. The data analyzer 150 may use a mathematical model to process structured metadata from the data lake 140 and execute calculations for determining individual standard rule as well as overall standard score combining all the rules. Further, the data analyzer 150 may predict a reduction in an amount of carbon generation, optimizations for standard score and improvisation in the individual standard rules violations augmented with training data store from the data lake 140. Also, the data analyzer may provide an analytical dashboard that provides the client with a provision to try different set of optimizations on rules and foresee the standard score without actual implementations to prioritize an implementation phase. The proposed disclosure therefore facilitates system performance optimization by optimizing the software in view of the different set of optimizations on rules provided by the data analyzer.

Figure 2:
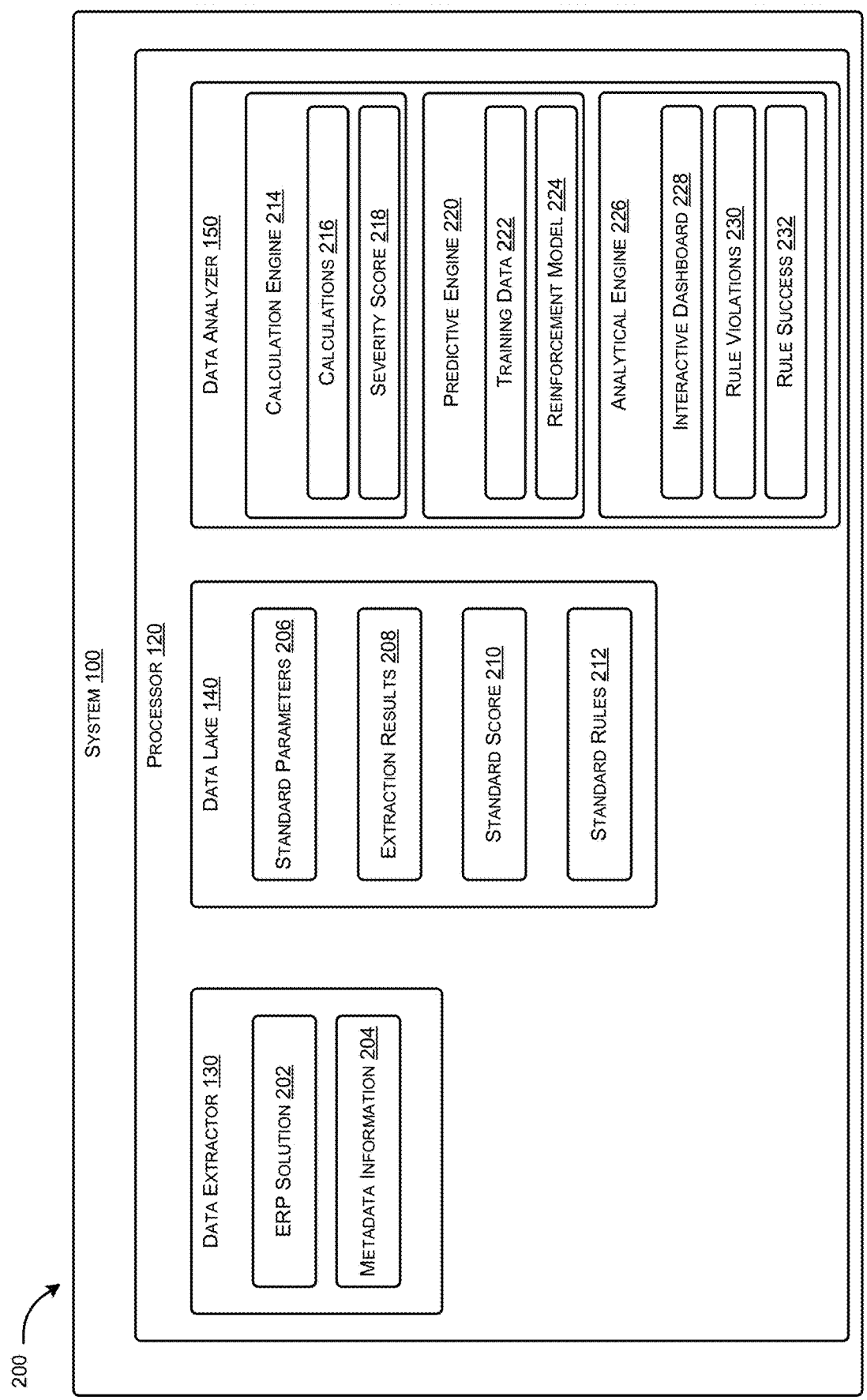
FIG. 2 illustrates components of the system of FIG. 1, according to an example embodiment of the present disclosure.
Figure 3:
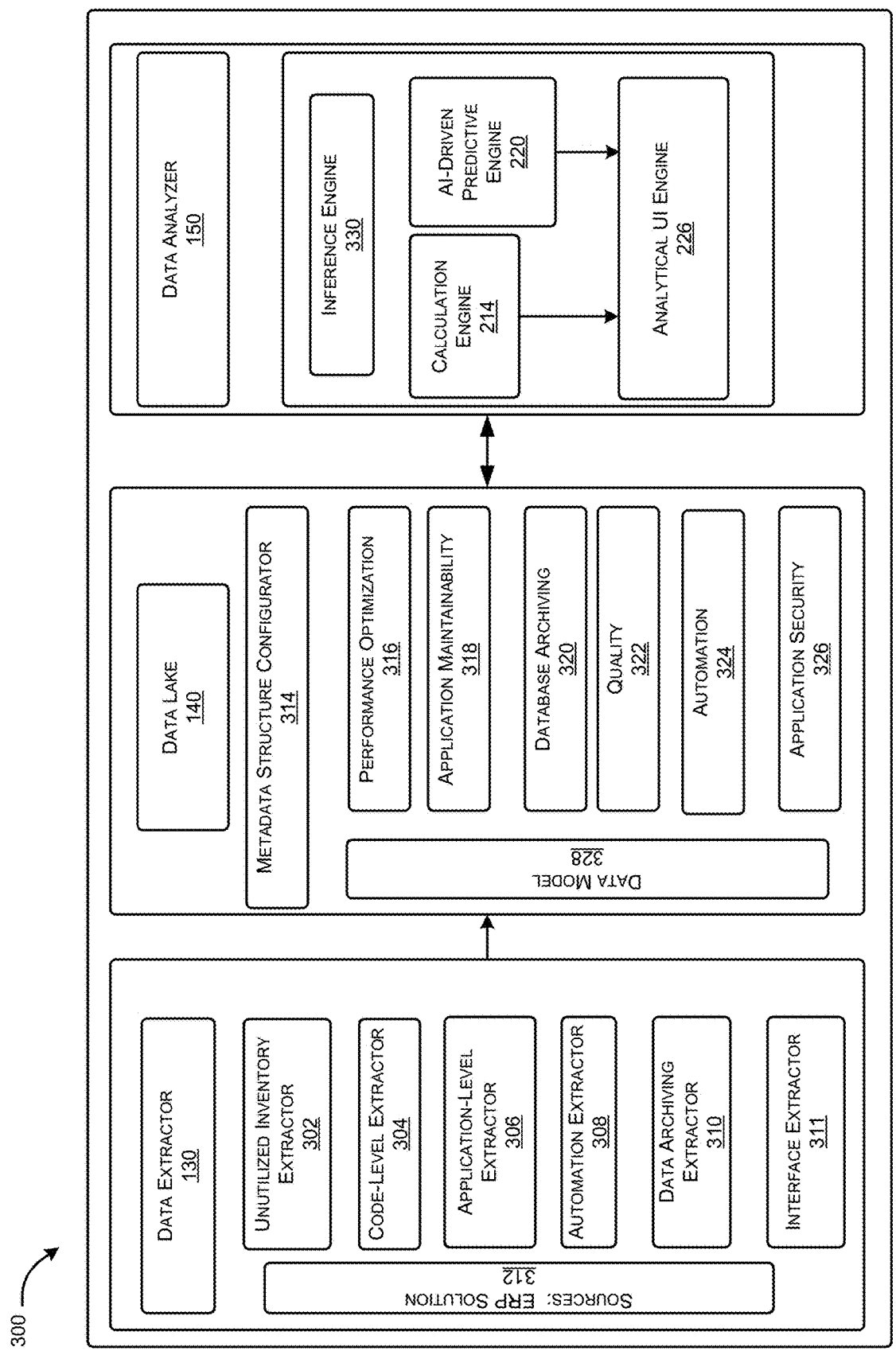
FIG. 3 illustrates architecture for the system of FIG. 1, according to an example embodiment of the present disclosure.

FIG. 2 illustrates components of the system 100 of FIG. 1, according to an example embodiment of the present disclosure. The system 100 may include one or more components that may enable extraction of metadata information from information available in a data lake 140 and may provide calculations for determining the standard score along with standard rules augmented with training data stored in the data lake 140. For example, the system 100 may include the processor 120 coupled to one or more components such as the data extractor 130, the data lake 140, the data analyzer 150. Adperson having ordinary skill in the art would understand that the system 100 and/or the components described herein are examples and that similar or additional systems and/or components may be employed for carrying out the functionalities related thereto described in the present disclosure. The components are discussed in conjunction with architecture 300 for the system 100 illustrated in FIG. 3. The architecture 300 provides a workflow for the components during operation. However, any other suitable architecture 300 or related workflow may be contemplated based on the embodiments and concepts described in the present disclosure.

In an embodiment, the data extractor 130 may determine metadata information 204 from an ERP (software) solution 202. Standard parameters associated with performance of the software solution that are in line with standard rules may be established so as to be processed by the data extractor 130 to compute the standard score. The standard parameters may perform analysis at a source code level and at an application level of the ERP solution. The standard parameters at the source code level may include a number of rule violations and successful rule executions being performed at the code level as per best programming practices for performance efficient solutions. Further, the standard parameters at the application level may provide outcome of key tangible numbers for the ERP solution that are critical for the ERP solution's efficiency and performance optimizations, e.g. unused custom code or master data.

In an embodiment, the standard parameters that are in line with the standard rules may be categorized and prioritized as low, medium or high based on its severity of performance optimizations and risk categorization. An extraction engine may include various extractors that may scan the ERP solution and gather the metadata information associated with matching patterns and may store scanned structured metadata in a prescribed format as per standard rules to the data lake 140.

The data extractor 130 may have an unutilized inventory extractor 302 that checks for and determines unutilized technical and functional artifacts, master data, incomplete business documents and existing errors pertaining to the ERP solution 312. The data extractor 130 may have a code-level extractor 304 that scans the ERP solution 312 at a source code level for determining the ABAP and UI5 and check for performance optimization considerations in present in a custom code. One of ordinary skill in the art will appreciate that the data extractor 130 may be developed for being used in various additional programming languages used in the IT and ERP systems for performing standard score calculations to determine the standard score.

The data extractor 130 may further include an application-level extractor 306 that scans the ERP solution 312 at a system level and check for parameters that are critical for performance optimizations and system maintainability. Further, the data extractor 130 may include an automation extractor 308 that scans the ERP solution 312 and checks for automation potential for repetitive manual tasks. The data extractor 130 may also include a data archiving extractor 310 that scans the ERP solution 312 to check for determining large sized standard and custom tables that may be suitable for archiving support thus reducing consumption of disk space. The data extractor 130 may also include an interface extractor 311 for validating integrations and interfaces. The interface extractor 311 may scan satellite system connected interfaces for determining usage statics, quality parameters, and identifying candidates that may be good for retirement-interface artifacts created but were never used.

In an embodiment, the system 100 may include the data lake 140. The data lake 140 may be a central repository that may store all of the scanned metadata information passed by the extraction engine. The data lake 140 may store the extracted metadata based on the standard parameters 206 that are ready to be consumed by intelligent engines for further processing. Also, the data lake 140 may store extraction results 208 that may include calculated standard score(s) 210 determined using a calculation engine and standard rule(s) 212 scanned against successful rules and violation rules for each of the rule as training data for AI engine processing. Further, the standard parameters may enrich real time data store available for business intelligence and analytics insights by adding historical data comparison, and predefined best practices.

In an embodiment, the data lake 140 may include a metadata structure configurator 314, in which the extracted metadata information may be stored. The extracted metadata information may be mapped against identified derivatives. The data model 328 may maintain information relating to performance optimization 316, application maintainability 318, database archiving 320, quality 322, automation 324, and application security 326. The data model 328 may contain a structure with columns such as but not limited to scan ID, rule ID, rule name, rule sub-category, violation count, successful event count, extractor utility, and other such columns. The data model may be stored in data lake databases such as, for example, SAP HANA in memory databases, or SAP HANA Cloud, Data Lake, and other such storage structures.

In an embodiment, the data analyzer 150 may include a calculation engine 214, a predictive engine 220, and an analytical engine 226. An inference engine 330 may also be configured to include the calculation engine 214, the AI driven predictive engine 220, and the analytical UI engine 226. The calculation engine 214 may calculate the standard score calculations 216 while considering weight, severity 218, and violation count of each of the standard parameter as input from the data lake 140. A mathematical model may leverage a sigmoid function to achieve outcomes with high accuracy. Weight calculations may be done based on data related to historical rule violations and industry benchmarks. Individual severity and weights may be calculated over maximum severity and weights for each of the rule and the sigmoid function may be applied to determine the standard score. Outcome of the calculation engine 214 may be the standard score.

The predictive engine 220 may leverage a Reinforcement Learning (RL) model 224 to provide suggestions to optimize the standard score based on training data 222. The training data 222 includes information related to the rule violations and the standard score. The RL model 224 may be trained based on various past real time calculations that are stored in the data lake 140 to suggest an optimization. The optimization may be suggested to attain optimized standard score along with predictions on potential reductions in violations of the standard rules.

Figure 6:
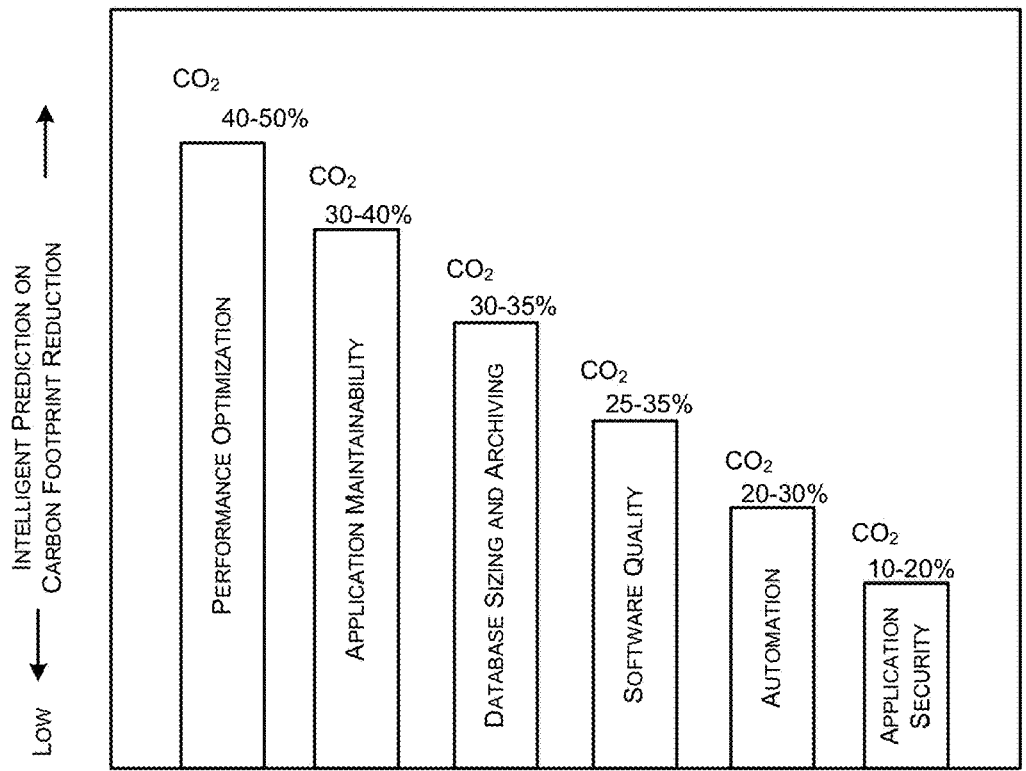
FIG. 6 illustrates a predictive analytics graph for carbon footprint reduction with respect to the standard parameters, according to an example embodiment of the present disclosure.
Figure 7:
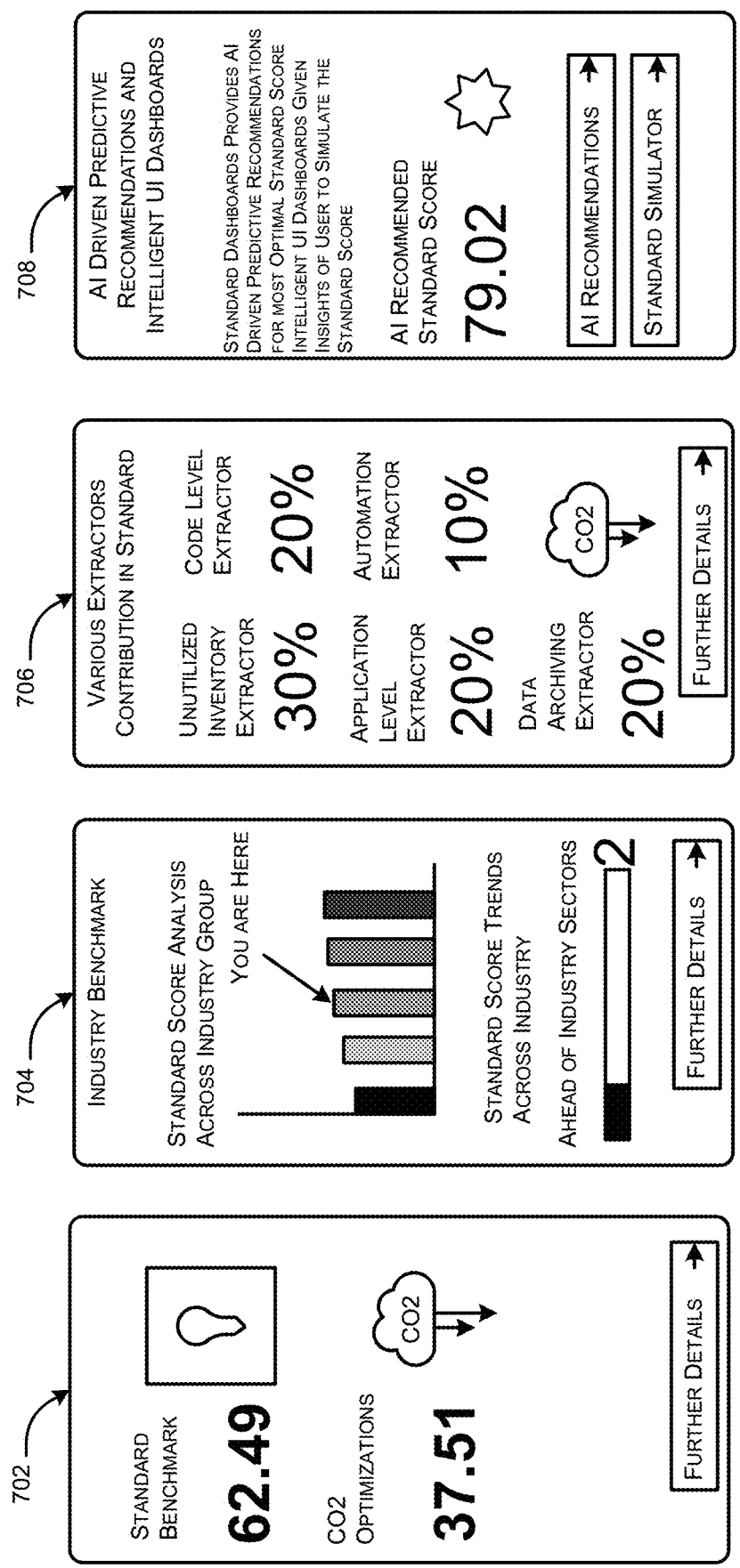
FIG. 7 illustrates an analytical dashboard powered by artificial intelligence (AI) to provide AI driven predictive recommendations for benchmark improvisations and analytical analysis according to an example embodiment of the present disclosure.

The analytical UI engine 226 may facilitate the clients for providing deep insights of the rule violations and understanding of the standard score evaluations by presenting information on analytical and interactive dashboards 228. The analytical and interactive dashboards 228 may be used by the clients to predict an improvement in the standard score and reduction in the carbon footprint by simulating improvisations against each rule violation 230 as per an organization's priority. The analytical UI engine 226 may connect with the calculation engine 214 and the AI-driven predictive engine 220 in the backend to perform re-calculations based on user prioritizations. Using the analytical interactive dashboard, the client may foresee best possible standard scores and may thus evaluate and determine reductions related to the carbon emission and energy consumption without actual implementations on the ERP solutions. In an embodiment, FIG. 6 illustrates a predictive analytics graph for carbon footprint reduction with respect to the standard parameters, according to an example embodiment of the present disclosure. As is illustrated, upon improving a performance optimization parameter the carbon footprint may be reduced up to e.g., 40-50%, upon focusing on application maintainability parameter of the ERP solution, the carbon footprint may be reduced by e.g., around 30-40%. Further, managing database sizing and archiving may facilitate to reduce the carbon footprint by e.g., around 30-35%. On improving a software quality standard parameter, the carbon footprint reduction achieved may be around 25-35%. On automating a determined set of the instructions of the ERP solution, the carbon footprint may be reduced by around 20-30%. Further, improving on an application security parameter may reduce carbon footprint of the ERP solution by around 10-20%. Illustrated in FIG. 7 is an analytical dashboard with an interactive drill down of each of the pre-determined rule violations and standard score calculations, according to an example embodiment of the present disclosure. The analytical dashboard may display the standard score and the carbon footprint optimization along with standard parameters subcategory count, standard parameters individual score, and standard parameter individual score as a bar chart representation. Further, details of the standard parameters may be provided in the analytical dashboard 700.

Figure 4:
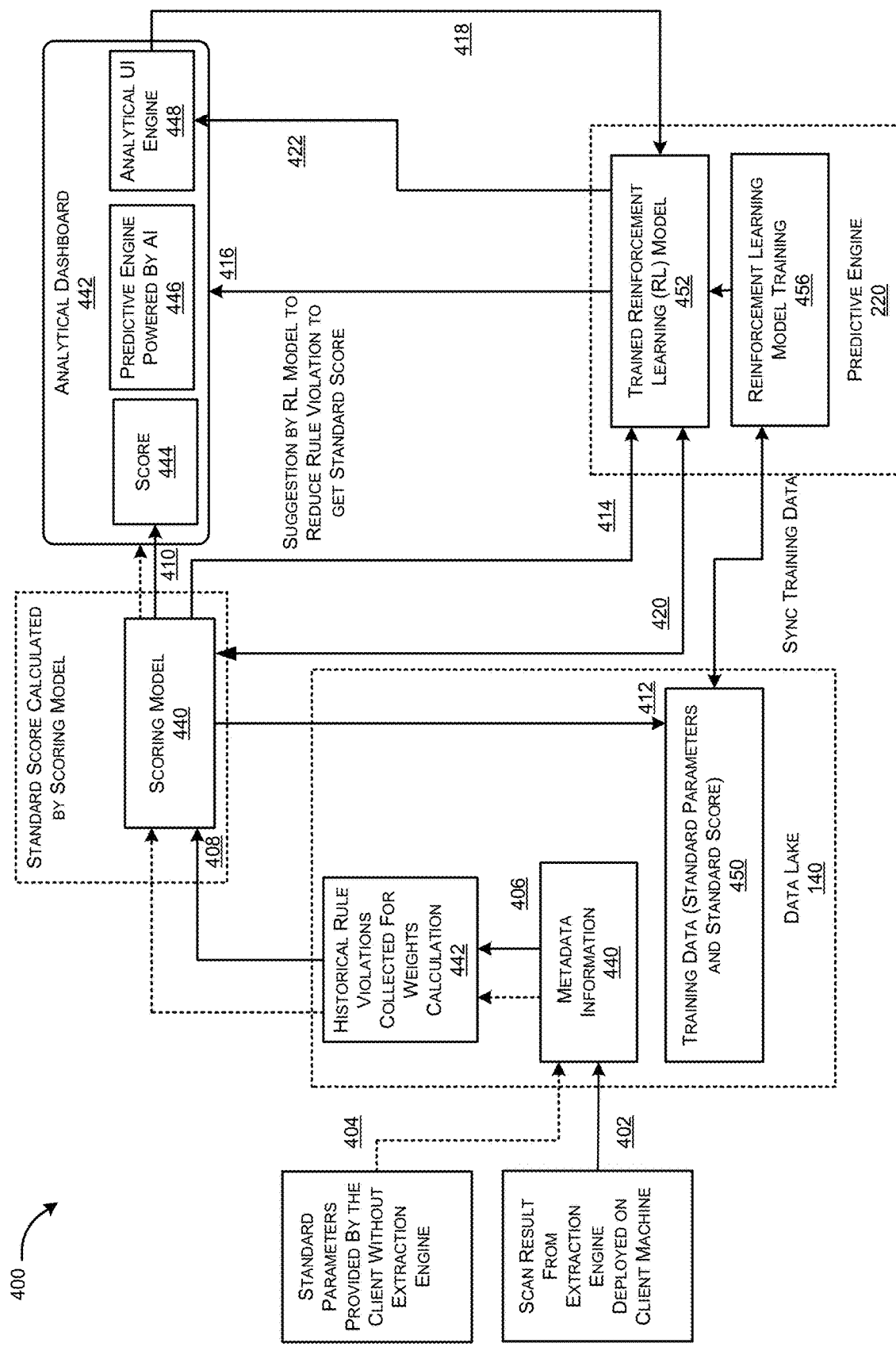
FIG. 4 illustrates a functional flow diagram of the system, according to an example embodiment of the present disclosure.

FIG. 4 illustrates a functional flow diagram of the system, according to an example embodiment of the present disclosure.

As illustrated in the functional flow diagram 400 in FIG. 4, at step 402 metadata information 440 may be extracted by scanning result from an extraction engine deployed one computing device of a client. The extracted metadata information may be stored in a data lake 140 for calculating a standard score.

At step 404, if the deployment of the extraction engine is not feasible or extractors to be deployed are not compatible to be executed on the computing device of client, a plurality of standard parameters may be captured as input from the client in a predefined format to perform the standard calculations and determine the standard score. The determined metadata information at step 402 and at step 404 may be collected as metadata information 440. At step 406, the metadata information 440 along with available industry benchmarks may be processed by a calculation engine to execute weight calculation for processing by a mathematical model. Using the metadata information, historical rule violations may be collected for calculating weights at 442.

At step 408, the standard score may be calculated by using a scoring model 444 present at a calculation engine. For calculating the standard score, the determined metadata may be processed to calculate weights and severity using a mathematical sigmoid function formula. The sigmoid function formula may be used to drive calculation of the standard score for each of a standard rule and may thus calculate a final standard score for all of the standard rules.

At step 410, the calculated final standard score and available corresponding carbon footprint with respect to the calculated score may be presented to the client on an analytical dashboard. The analytical dashboard may provide the standard score at 444 for each of the scanned rule and may provide a detailed analysis report related to success and violations of each of the rule. The analytical dashboard may be used by the client to gain real time insights of the ERP solution. As may be appreciated, the scores to be presented on the analytical dashboard 442 may be enhanced by an AI driven predictive engine 446 that may predict reduction in the carbon footprint, optimizations for the standard score and improvisation in individual standard rules violations. The scores may be augmented with training data stored in the data lake 140. Further, at 448, an analytical UI engine may provide the client with a provision to try different set of optimizations on the rules and foresee the standard score without actual implementations to prioritize an implementation phase.

At step 412, final standard score and a plurality of standard parameters with details of number of violations and successful cases scanned may be stored in the data lake 140 as training data 450 further for AI related processing using a RL model. The final standard score and the plurality of parameters may be stored on every run for each of the client to create training data in the data lake 140. The training data may be used to train an AI model for predicting standard optimizations and facilitates to reduce carbon footprint.

At step 414 and 416, an AI engine may process the standard score and may use the training data as input from the data lake 140. At step 414, suggestions from the RL model may be received to reduce rule violations and obtain the standard score. The suggestions may be stored in a trained RL model 452 to create a predictive model using a predictive engine 220 for improving the standard score and reducing possible carbon emissions. Multiple calculated parameters' optimizations may be performed based on predictability analysis used by the predictive model. The analysis as received from the predictive model may support organizations to plan their ERP solutions improvisations and actual implementation based on predictability analysis. Further, in pre-defined intervals, the trained RL model 452 may be synchronized with the RL model training 456 for predictability improvisation that is a component of the predictive engine 220. In addition, training data stored in the data lake 140 may be synced with the RL model training 456 at fixed intervals to update AI driven calculations of the RL model 452.

At step 418, the analytical UI engine 448 may add more power to the AI engine predictions by allowing the client to simulate the standard score that may be achieved by changing key violations before an actual implementation. This may support the organizations to prioritize an actual implementation of the rules violations as per the organization's available resources.

At steps 420, and 422, the trained RL model 452 may interact with the scoring model 440 and the analytical UI engine 448 respectively to facilitate predicting of the standard score for the client by changing inputs using interactive analytical dashboards. Further, the training data stored in the data lake 140 may be synced with the RL model at fixed time intervals to update the RL model AI driven calculations.

Figure 5:
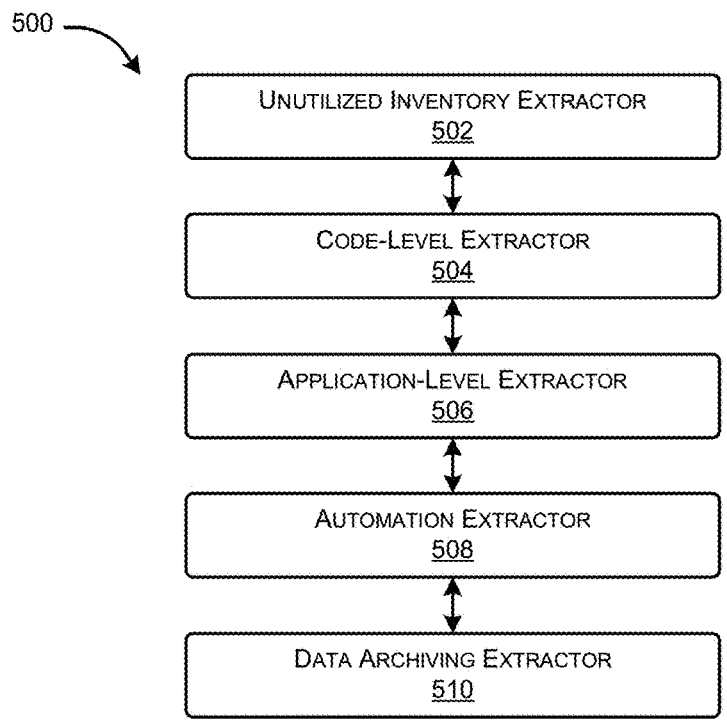
FIG. 5 illustrates an architectural diagram of a data extractor of the system, according to an example embodiment of the present disclosure.

FIG. 5 illustrates an architectural diagram 500 of a data extractor 130 of the system 100, according to an example embodiment of the present disclosure. An extraction engine of the data extractor 130 may include a plurality of extractor utilities. Unutilized inventory extractor utility 502 may scan the ERP solution and check for availability of unutilized technical and functional artifacts, master data, incomplete business documents and existing errors. A code-level extractor utility 504 may scan the ERP solution at a source code level for the ABAP and the UI5 and may check for performance optimization considerations in the custom code. An application-level extractor utility 506 may scan the ERP solution at a system level and may check parameters that may be critical for performance optimizations and system maintainability e.g. capturing frequently occurring short dumps. An automation extractor 508 may scan the ERP solution and may check if there is automation potential for repetitive manual tasks. Further, a data archiving extractor 510 may scan the ERP solution and check for availability of large sized standard and custom tables that may be suitable for archiving support reducing disk space.

FIG. 7 illustrates an analytical dashboard powered by artificial intelligence (AI) to provide AI driven predictive recommendations for benchmark improvisations and analytical analysis according to an example embodiment of the present disclosure. As is illustrated at 700 is an analytical dashboard that is powered by AI. The analytical dashboard may provide AI driven predictive recommendations on the standard score improvisations and analytical analysis. The dashboard may allow providing the user with deeper insights to prioritize critical tasks. With respect to FIG. 7, the analytical dashboard may be divided into four categories. At 702, the standard score benchmarks and carbon reduction recommendations may be provided where AI driven predictions to reduce carbon footprints for software solution derivatives may be provided. At 704, industry benchmark analysis may be provided that includes AI driven deep analysis of software solution benchmark of an Industry within a specific Industry sector, across Industry sector, within selected geography, and industries having similar ERP customizations. At 706, an extractor level contribution in the software solution may be provided. Extractor level contribution to software and detailed analysis of optimizations may be needed under each extractor utility based on the standard rules. At 708, an AI driven predictive recommendations and Intelligent Interactive user interface may be provided. The AI driven predictions and interactive user interface dashboards may include (i) an AI driven predictive recommendations on the software solutions benchmark improvements, and (ii) an intelligent interactive user interface that may allow the user to simulate the software solution benchmark that may be achieved by reducing violations powered by AI driven assisted recommendations.

In an exemplary embodiment, the extractor may scan three standard rules and standards may appear on an analytical dashboard. R0001 standard rule may correspond to identifying unused custom code, R0002 may correspond to analyzing frequent occurring dumps, and R0003 may correspond to avoiding select* on unwanted table fields.

Figure 8A:
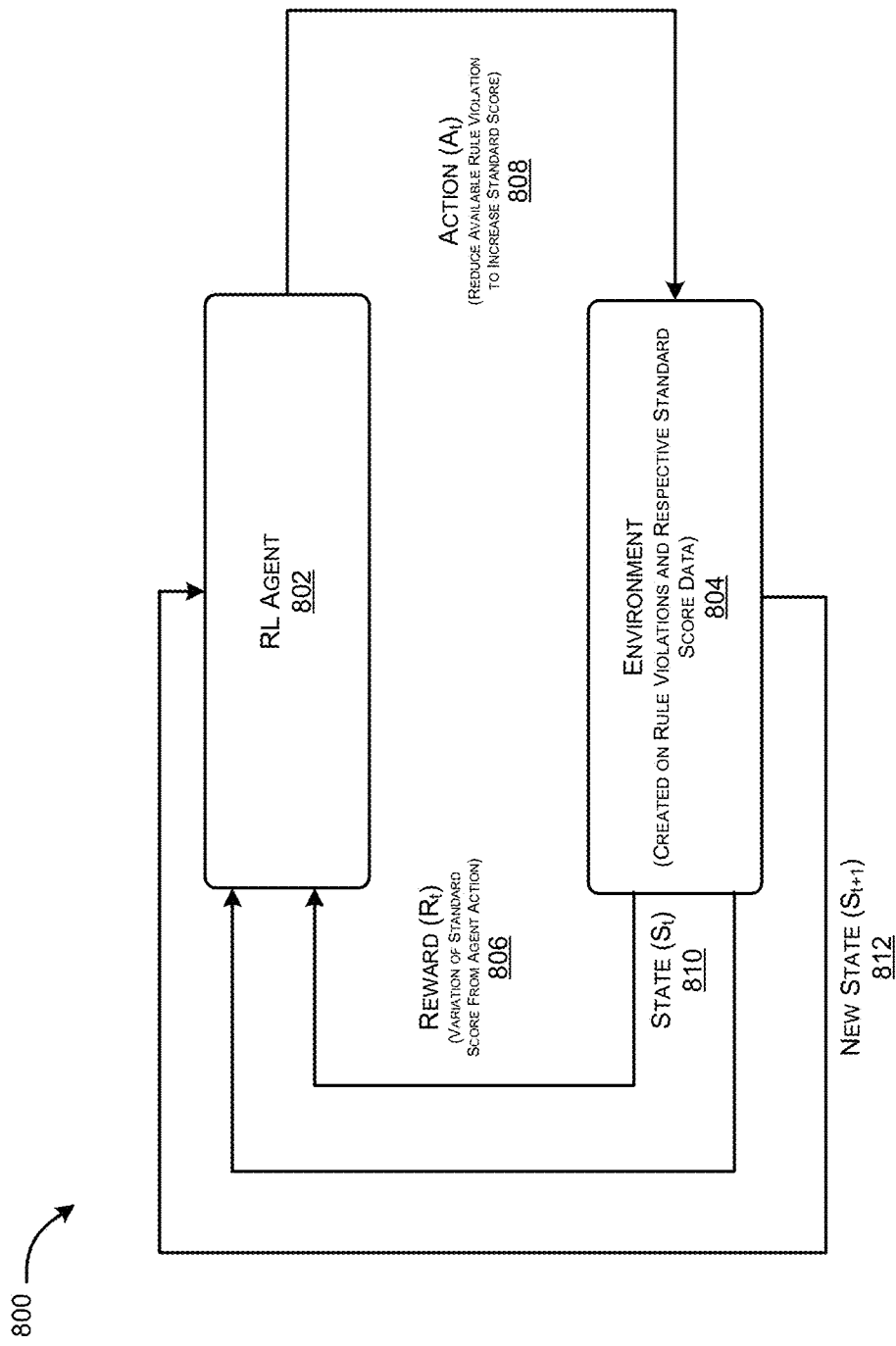
FIG. 8A illustrates an exemplary Reinforcement Learning (RL) model, according to an example embodiment of the present disclosure.

FIG. 8A illustrates an exemplary RL model, according to an example embodiment of the present disclosure.

In a supervised learning scenario, a machine learning (ML) model may have a supervisor that gives a ground truth for every data point. The ML model may learn by minimizing a distance between its own prediction and ground truth. The dataset may thus be required to have an annotation for each data point. In unsupervised learning, the model may not have access to the ground truth of the data and thus may learn about distribution and patterns of the data without them. In reinforcement learning, RL agent 802 may refer to the ML model that may learn to complete a task. The RL agent 802 may learn primarily by receiving reward signals, which are a scalar indication of how well the RL agent is performing a task.

With respect to FIG. 8A the RL agent 802 may receive a set of inputs from an environment 804. The environment 804 may be include a list of rule violations and respective standard score data. Information related to rewards ($R_t$) that are e.g., a variation of standard score from agent action may be determined at 806, information related to state ($S_t$) is determined at 810, and new state information is determined at 812. The information received at 806, 810, and 812 is sent as input to the RL agent 802. Based on the received information, the RL agent 802 may generate an appropriate action ($A_t$) 808. The action 808 may pertain to reducing an available rule violation to increase the standard score.

Figure 8B:
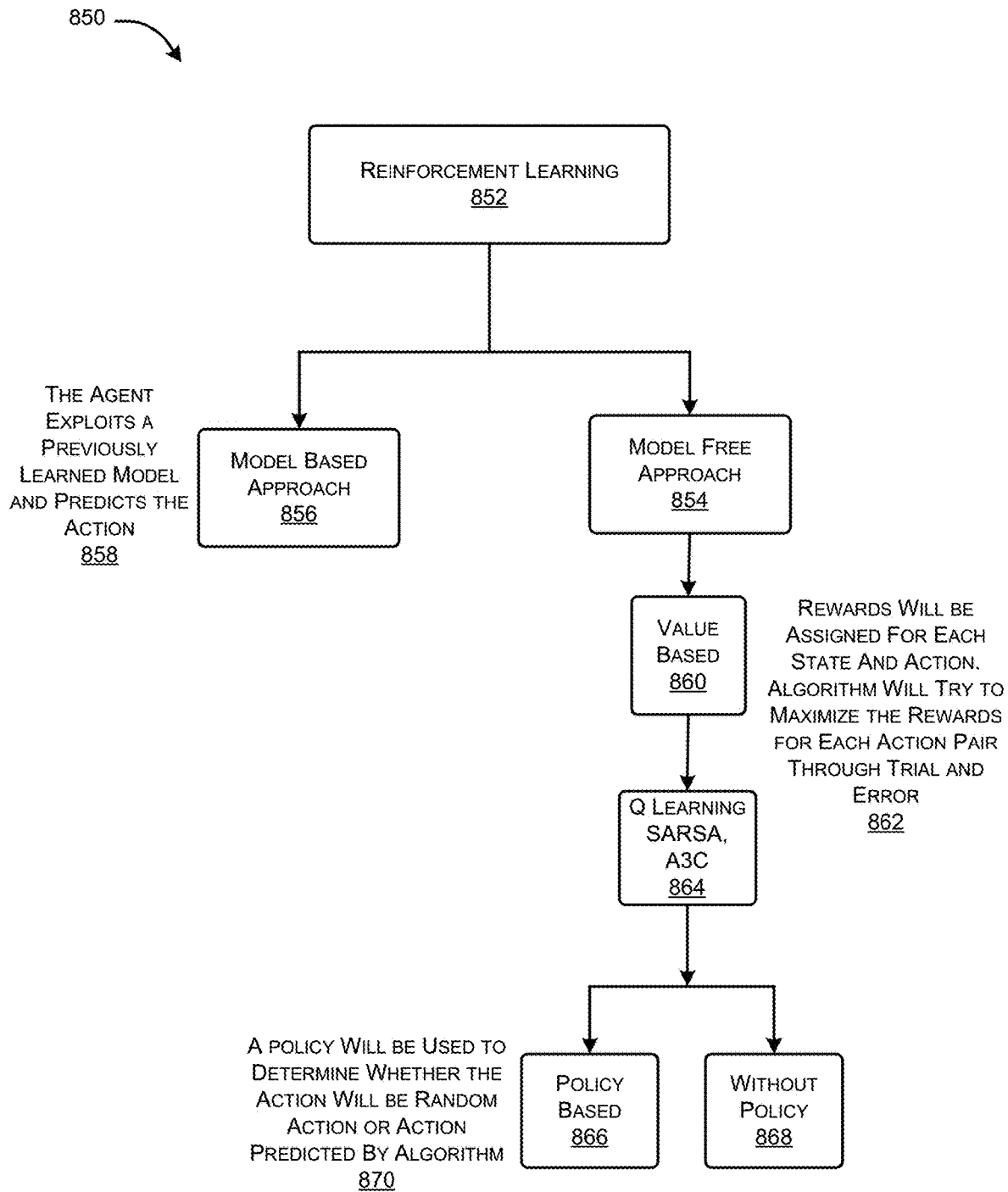
FIG. 8B illustrates multiple approaches available to implement the exemplary model, according to an example embodiment of the present disclosure.

FIG. 8B illustrates multiple approaches available to implement the exemplary RL model, according to an example embodiment of the present disclosure.

With respect to FIG. 8B, the model is the agent's representation of an environment, which predicts how the environment may react to the agent's actions. When an action is provided as an input, the model may generate a probability of a next state and a current state, or an enumeration of possible states with respect to provided rules of the environment. Further, the policy may be an algorithm or a function that outputs decisions made by the agent. The policy may facilitate to generate a scalar/single decision (e.g., by using a deterministic policy) or a vector of probabilities over possible actions (e.g., by using a stochastic policy).

In an embodiment, under the RL model, a reinforcement learning 852 may be executed. For implementing the reinforcement learning, a model based approach 856 may require gathering large amounts of data for training the RL agent 802. Further, for the model based approach 856, the RL agent may exploit a previously learned model to predict a probable action. Further, in the model based approach 856, a policy may be decided for the RL agent to take an action. The RL agent may learn a best action through exploration and exploitation.

A basic model free approach 854, in an embodiment, is provided to be implemented using Q-learning that is an off policy reinforcement learning algorithm. In the Q-Learning, the RL agent may take the action based on Q-Table values 860. At 862, a Q-Table may contain a state, and an action. Further, rewards may be assigned for each of the action, and a next state may be collected from multiple iterations and episodes. Once the state is determined, the RL agent may maximize rewards for each of the action pair based on the reward obtained through a trial and error mechanism.

As can be appreciated, deep Q network may be an advancement of the Q-learning algorithm 864, where a deep neural network may be used to predict a best action outcome from the Q-Table. Further, a customized environment may be created to generate states, actions and rewards required for a Deep Q-Networks (DQN) computation. The DQN computation may use two individual Q-networks to predict an action. Further, weights from a main DQN network may be copied to a target Q network after a defined number of episodes. A dequeue buffer may be used to perform experience replay. Once the RL agent performs, a number of required actions and a random set of experiences may be pulled, and rewards may be optimized. In an embodiment, at 870 an epsilon decay policy 866 may be used for the RL agent to determine whether the action to be performed is a random action or an action is to be predicted by an algorithm. Initially, an epsilon value may be decided and further reduced over iterations so that the agent may initially take an action randomly and over a period of time may take actions from learning. Also, at 868, a decision to avoid using a policy may be implemented.

Figure 9:
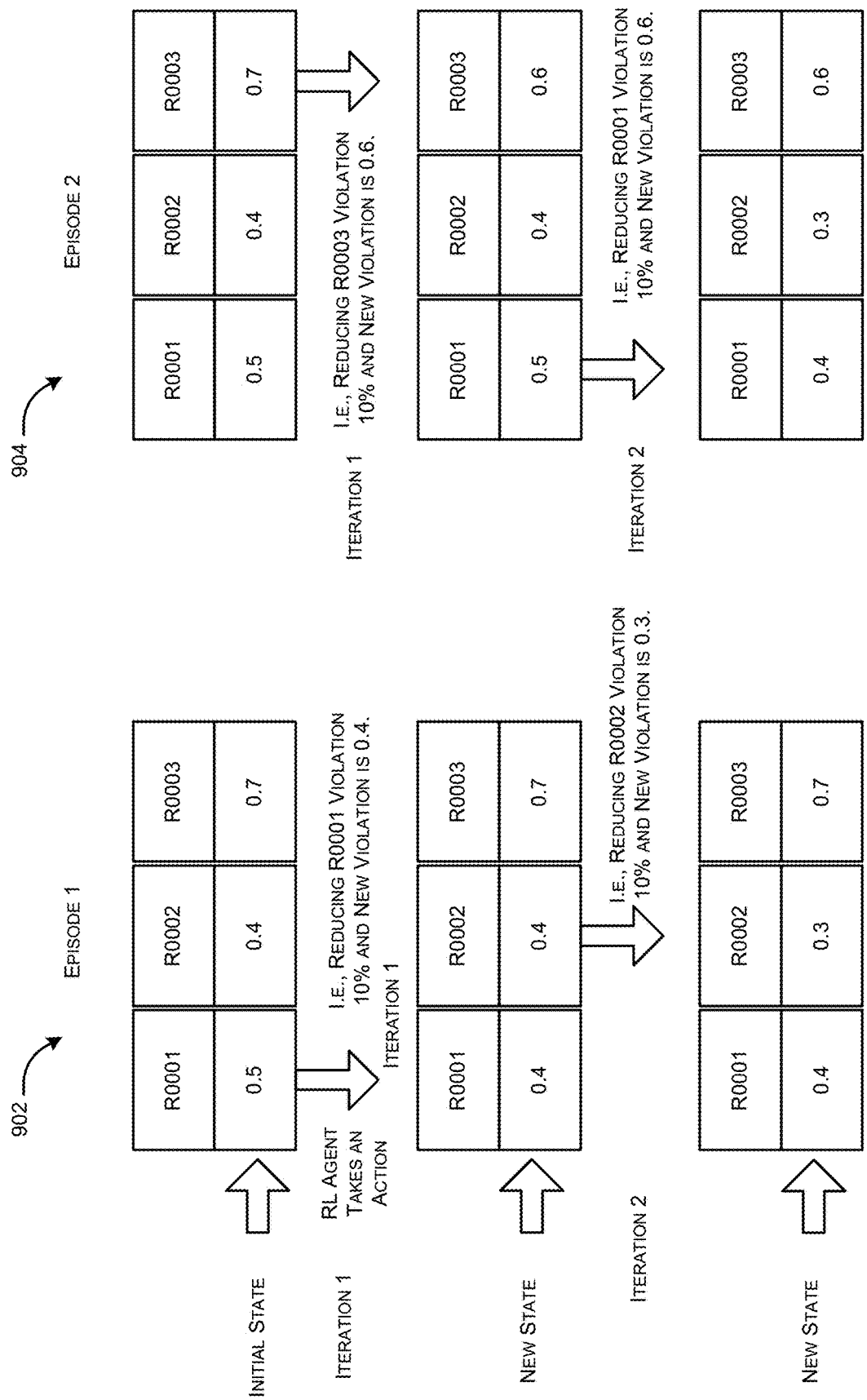
FIG. 9 illustrates an exemplary implementation of the RL model showing resulting states and actions, according to an example embodiment of the present disclosure.

FIG. 9 illustrates an exemplary implementation of the RL model showing resulting states and actions, according to an example embodiment of the present disclosure.

With respect to FIG. 9, as is shown is a customized environment that is created on a rule violation, with a respective score collected in a data lake. Rules of the extraction engine as discussed earlier may serve as a state for the RL agent to take further actions. For example, the system 100 may be scanned with three rules such as R0001, R0002, R0003 to obtain various states and actions as are illustrated. As is shown, a determination of variance in the standard score after taking a step may be updated as a reward for the RL agent. This may be represented as:

Reward policy $R = G_{t+1} - G_t$

Where, $G_t$—CurrentGreenITScore $G_{t+1}$—NewGreenITScoreafteragenttakinganaction, With respect to episode 1 at 902, initially at iteration 1, the RL agent may take an action to reduce R0001 violation by 10% such that a new determined violation at a new state is 0.4. In a second iteration, the R0002 violation may be reduced by 10% and a new violation at a new state may be obtained as 0.3. Similarly for episode 2 at 904, at a first iteration, R0003 violation may be reduced by 10% to obtain a new violation as 0.6. Further, at iteration 2, the R0001 violation may be reduced by 10% and a new violation may be obtained as 0.6.

In an exemplary embodiment, a RL Model Pseudo code is provided:

```
For episode=1, 2,..max_episodes
Get initial state S
    If random value <Epsilon (ε)
       Take random action
       Get next state S', reward r
    Else
       Predict action from main_dqn_network
       Get next state S', reward r
    If episodes reach experience threshold E
       Get sample experience from buffer.
       Update reward with Bellman's Equation
If episodes reach C multiples
    Copy weights from main_dqn_network to target_dqn_network.
    Add S, a, r,S' to buffer
    Reduce ε value
    Set next state S to state S
```

Figure 10:
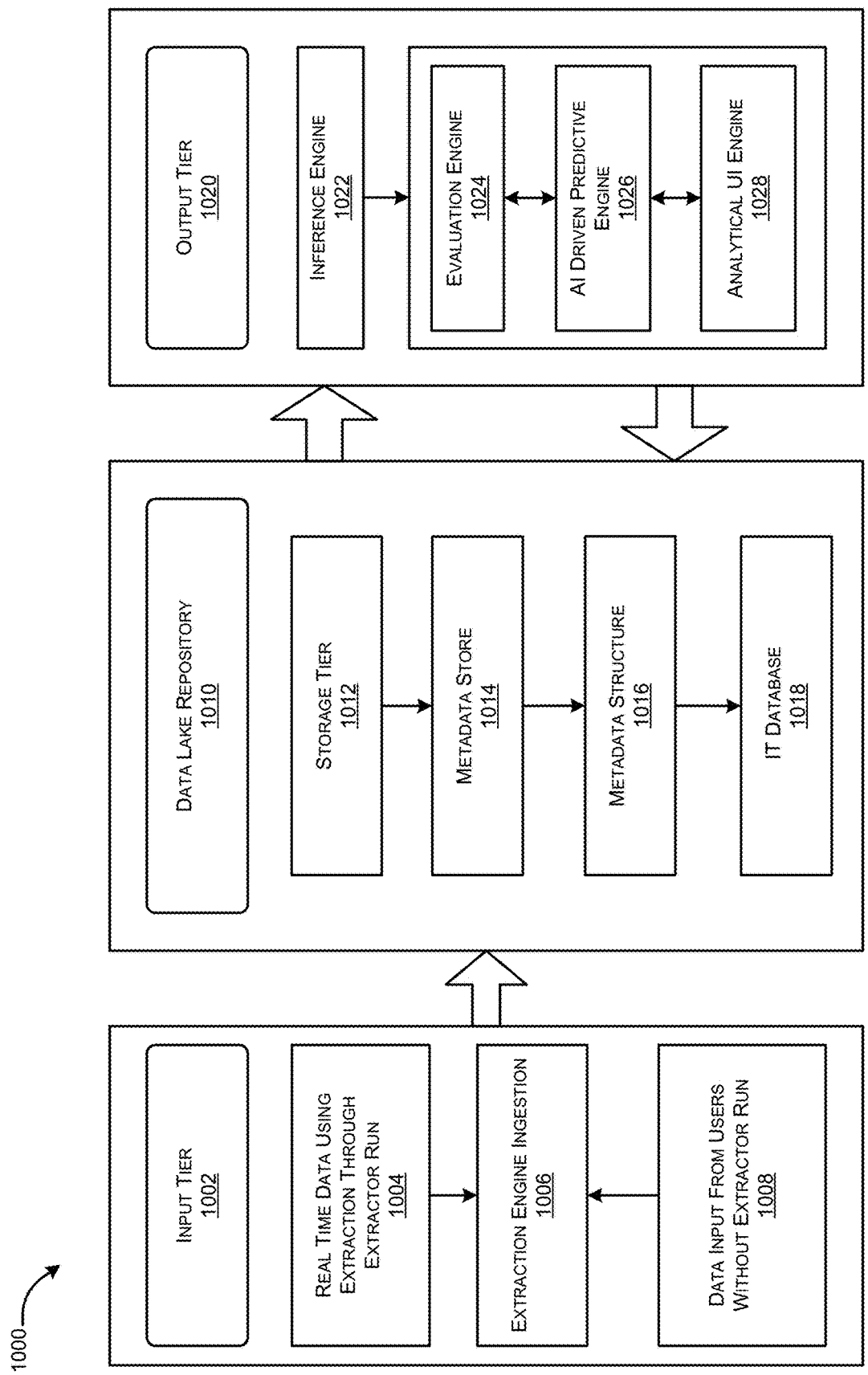
FIG. 10 illustrates additional technical details of the system, according to an example embodiment of the present disclosure.

FIG. 10 illustrates additional technical details 1000 of the system, according to an example embodiment of the present disclosure.

With respect to FIG. 10, as is illustrated is an input tier 1002 that may include an extraction engine that extracts real time metadata using an extraction engine installed on the client device at 1004. Also, real time metadata may be received from the clients directly as an input without using an extractor engine at 1008. The inputs as received at 1004 and 1008 may be used by extraction engine ingestion at 1006.

In an embodiment, output from the input tier 1002 e.g., the real time metadata information may be sent to a data lake repository 1010. If extractors of the extraction engine are deployed on the client device, then the extracted metadata information may be stored in the data lake repository 1010. Further, if deployment of the extractors is not feasible on the client device, metadata information as received from the client device in a prescribed format may be sent as input to the data lake repository 1010.

The data lake repository tier 1010 may consist of a storage tier 1012 that may be connected to a metadata store 1014 having metadata stored in a structured format as per each of a derivative such as related to performance optimization, application maintainability, database archiving, quality, automation and security. The data lake repository 1010 may act as a centralized repository that may store the metadata available in a specific predefined structure such as a metadata structure 1016. The metadata as received in the metadata structure may be maintained in an IT database 1018 and may contain metadata received from the extraction engine by scanning the ERP solution and supports standard benchmark metric analysis. Use of the data lake repository 1010 may enable providing fast processing of structured metadata input for a calculation engine using a mathematical model, and may store training data that is leveraged by the AI engine for predictability.

The metadata as stored in the data lake repository 1010 may be sent as input to output tier 1020. An inference engine 1022 of the output tier 1020 may receive the metadata information from the data lake repository 1010. The metadata as received may be processed using a calculation engine 1024 to determine a standard score based on a mathematical model executing on an AI driven predictive engine 1026. The calculation engine 1024 may provide the standard score using a mathematical model (e.g. sigmoid). Also, the AI driven predictive engine 1026 may provide standard score optimization details and required details related to CO2 emission optimizations after computation of an initial standard score.

The standard score as determined using the AI driven predictive engine may be provided to the client via an analytical user inference engine 1028. The determined standard score may be related to predicting performance of the executed ERP solution and reduction in carbon production.

In an embodiment, a mathematical model for the standard score may be provided, where the standard score of the ERP solution may be calculated by the mathematical model e.g., using a sigmoid function. Further, weights may be derived based on a historical data for each of a rule. Severity values may be assigned based on a rule severity i.e., high, medium and low. As can be appreciated, the high severity rule may have a maximum severity score and the low severity rule may have a minimum severity score. Initially, a violation score (e.g., 0 to 100%) may be calculated for each of the rule. i.e. product of the severity and the weights for each of the rule may be divided by the maximum severity and weights. The standard score may convey an amount of optimization and stability for the ERP solution. Since the standard score is an inverse of a violation score, the standard score may be calculated by subtracting a violation score from a maximum score.

The Sigmoid function $(1/(1+e^{(-x)}))$ may be used to calculate the standard score. The severity and weights may be used as parameters to the sigmoid function. Based on an impact of each of the rule i.e., Low, Medium or High, the severity score i.e., si—Severity value for Rule i may be assigned. As can be appreciated, historical rule violations from multiple industries may be collected in the data lake repository 1010 to determine a threshold value for each of the rule. For a rule to calculate the standard score, weights may be assigned to a rule violation based on the collected historical data. For each of the rule, there may be a maximum weight assigned based on the historical data. Product of the maximum score and severity for the rule (mi) may be used as an outbound value for violation of the rule. Upon a rule's violation's severity and weight values reaching 'mi' the standard score may attain a lowest value.

Historical scan results data of each of the rule may be taken into consideration for calculating the weight for the rule. Since, data distribution may be dynamic based on the client and the industry, quartiles of the data distribution may also change and provide dynamic weights from the data distribution. For a normal data distribution, the weights may be determined as follows:

$$GreenITScore = 100 \times \frac{1}{1 + e^{\left(\left(\frac{s_1 x_1 + s_2 x_2 + s_3 x_3 + \dots}{m_1 + m_2 + m_3 + \dots}\right) \times (Max' - Min')\right) + Min'}}$$

where, si—severity value for rule i, xi—calculated weight for rule I, mi—max severity and weight for rule i.

The disclosure proposes the standard score values to range from 0% to 100%. So, the calculated values may be normalized to a range −5 to 5 before applying the sigmoid function. For normalization, the disclosure considers e.g., Max'=5, and Min'=−5.

Figure 11A:
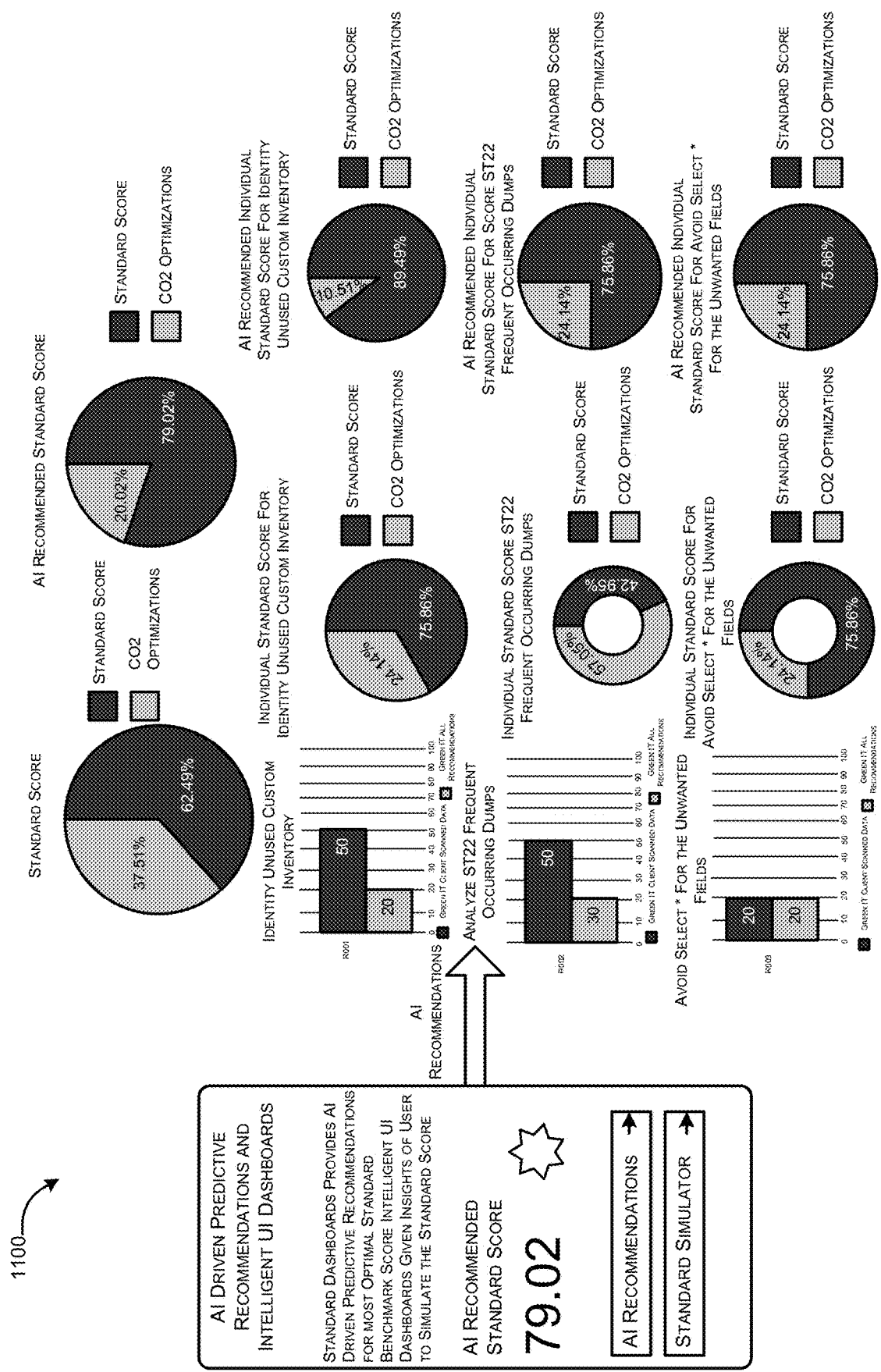
FIG. 11A illustrates an analytical dashboard depicting personalized AI driven predictive recommendations to improve standard score, according to an example embodiment of the present disclosure.

FIG. 11A illustrates an analytical dashboard depicting personalized AI driven predictive recommendations to improve standard score, according to an example embodiment of the present disclosure.

AI driven predictive recommendations may be provided to improve the standard benchmark for each of a relevant rule. This may facilitate to add business value to reduce carbon footprint and get assisted support. The standard benchmark calculation for the software solution may be processed by a trained reinforcement learning model to obtain AI recommendations. The RL model may provide the recommendations to optimize each of a rule to attain best standard benchmark.

With respect to 1100, a sequence diagram is illustrated where a user may select AI recommendations on dashboards to obtain an AI predicted standard benchmark. Further, (a) the dashboard may display AI recommended standard benchmark for scanned rules, (b) the user may select "AI recommendations" and the AI driven dashboard may open, (c) an AI driven RL model may predict for each of the standard rule a violation count that may be reduced further to achieve maximum standard benchmark, and (d) the user may access AI driven recommendations.

Figure 11B:
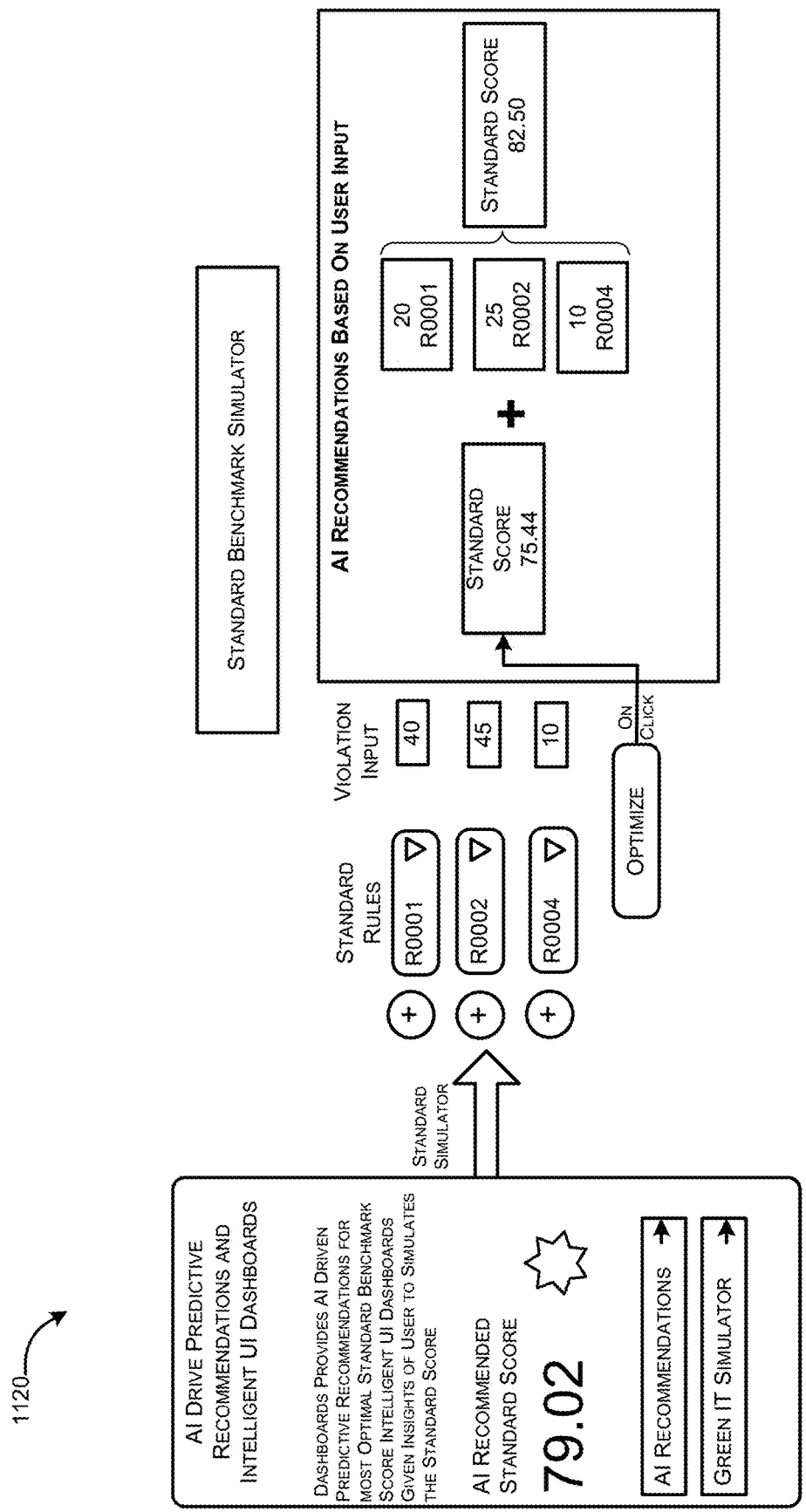
FIG. 11B illustrates an AI driven predictive recommendations dashboard for increasing the standard score, according to an example embodiment of the present disclosure.

FIG. 11B illustrates an AI driven predictive recommendations dashboard for increasing the standard score, according to an example embodiment of the present disclosure.

The AI driven predictive recommendations dashboard may provide a best possible increase in the standard benchmark. An intelligent interactive user interface (UI) may provide additional information and may allow the user to interact and simulate the standard benchmark by changing rules violations and corrections driven by the AI recommendations. This may facilitate the organization to prioritize conducting improvisations in the standard benchmark. As can be appreciated, the organizations may need a personalized assistant to simulate the standard benchmark improvisation that may be possible without actual implementation and may be prioritized as per available resources. The user may select applicable rules from the dashboards and may provide improved simulate input for the selected rule that needs to be achieved. Based on the inputs, an intelligent user interface may interact with the AI driven RL model and may display improvisations in the standard benchmark along with assisted AI driven recommendations for best possible score to the user.

With respect to 1120, in an exemplary embodiment, (a) the user may select for example a 'standard simulator' from the dashboard, (b) the user may obtain an input screen to provide an input on various derivates such that standard rules that may be optimized, (c) the user may click on "optimize" and the user interface may have displayed a new standard benchmark that may be achieved, and rules may be prioritized. For example, the rules those have less violation correction but are very critical for the standard benchmark may be prioritized first, (d) the user may also obtain AI driven recommendations to further optimize these rules and obtain the standard benchmark.

Figure 11C:
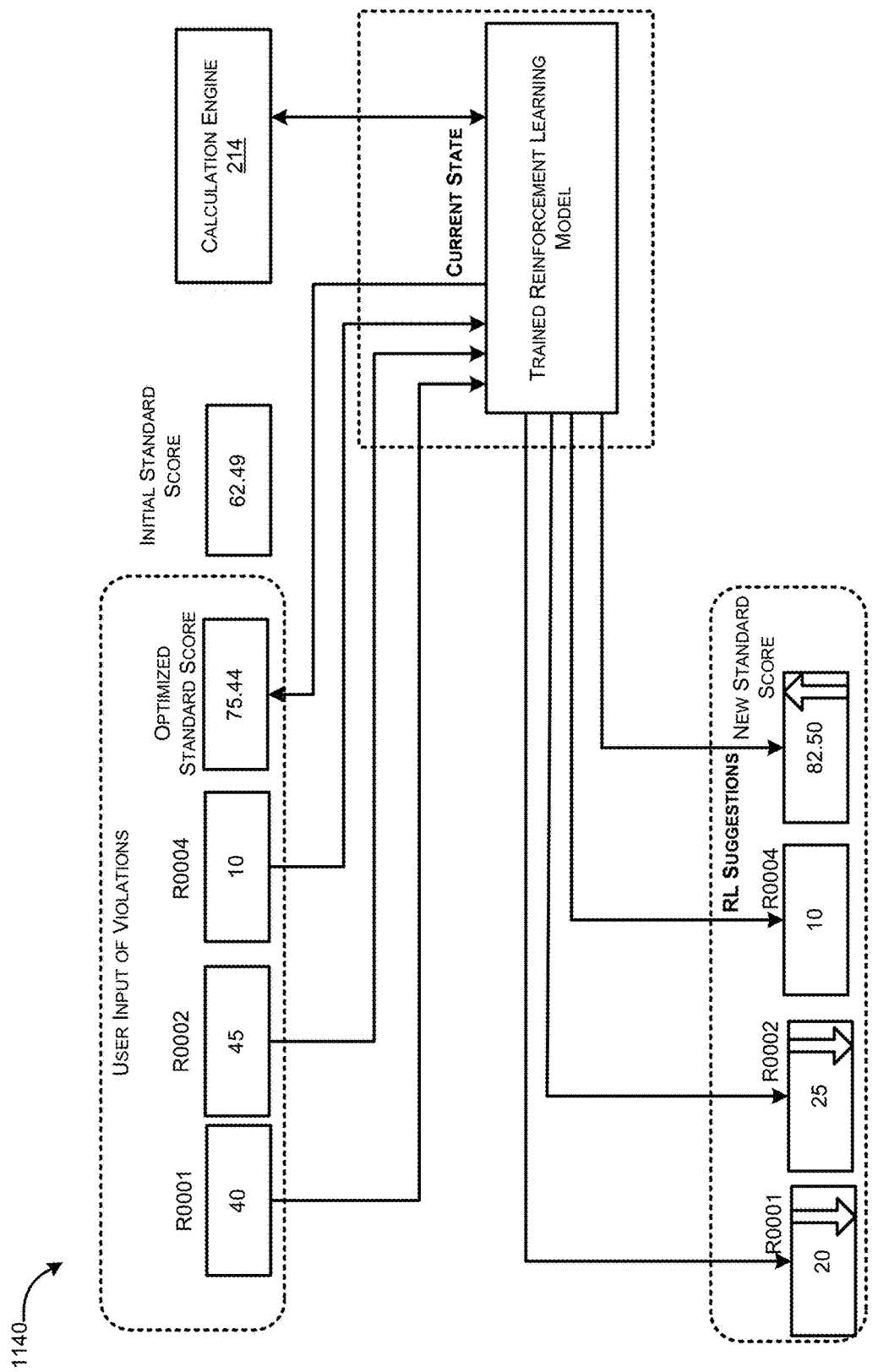
FIG. 11C illustrates a dashboard that provides AI recommendations based on user input, according to an example embodiment of the present disclosure.

FIG. 11C illustrates a dashboard that provides AI recommendations based on user input, according to an example embodiment of the present disclosure.

With respect to 1140, the user may provide an input for a potential standard benchmark that may be optimized to simulate the standard benchmark score improvisation. The AI driven RL model may receive the user input for the selected rules. Further, the AI driven RL model may interact with the calculation engine 214 to obtain optimum standard recommendations of the other standard rules based on the user input and best standard possible benchmark optimizations. For example, rule R0001 and rule R0002 may be based on user inputs, and the AI engine may recommend reducing the violation count further for better optimizations. Also, the standard benchmark may be further optimized if the AI driven recommendation is followed. Further, the dashboard may display the changed user inputs and AI driven suggestions back to user.

Figure 12:
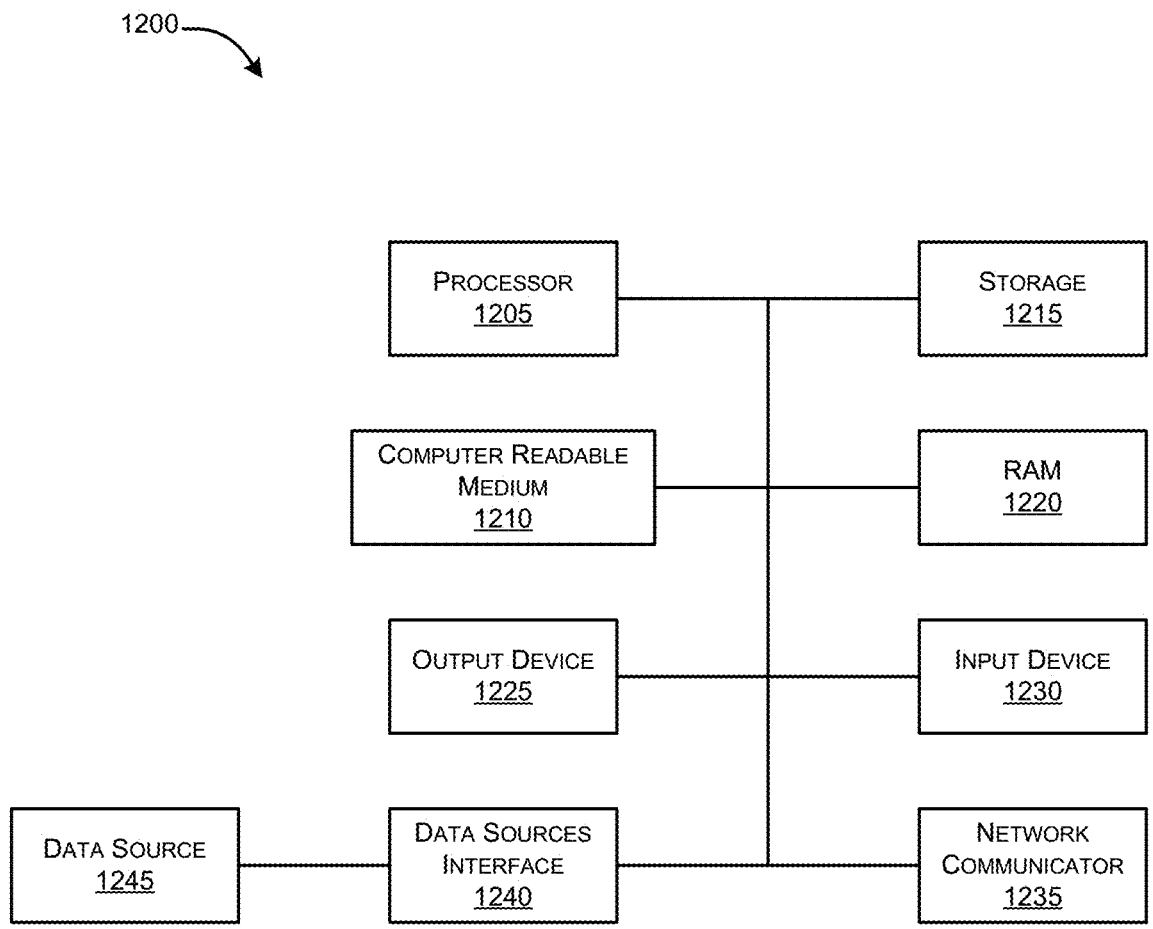
FIG. 12 illustrates a hardware platform for the implementation of the system, according to an example embodiment of the present disclosure.

FIG. 12 illustrates a hardware platform 1200 for the implementation of the system 100 of FIG. 1, according to an embodiment of the present disclosure. For the sake of brevity, construction and operational features of the system 100 which are explained in detail above are not explained in detail herein. Particularly, computing machines such as but not limited to internal/external server clusters, quantum computers, desktops, laptops, smartphones, tablets, and wearables which may be used to execute the system 100 or may have the structure of the hardware platform 1200. As illustrated, the hardware platform 1200 may include additional components not shown and that some of the components described may be removed and/or modified. For example, a computer system with multiple GPUs may be located on external-cloud platforms including Amazon Web Services, or internal corporate cloud computing clusters, or organizational computing resources, etc.

The hardware platform 1200 may be a computer system such as the system 100 that may be used with the embodiments described herein. The computer system may represent a computational platform that includes components that may be in a server or another computer system. The computer system may execute, by the processor 120 (e.g., a single or multiple processors) or other hardware processing circuit, the methods, functions and other processes described herein. These methods, functions and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system may include the processor 120 that executes software instructions or code stored on a non-transitory computer-readable storage medium 1210 to perform methods of the present disclosure. The software code includes, for example, instructions to gather data and documents and analyze documents. In an example, the data extractor 130, the data lake 140, and the data analyzer 150 may be software codes or components performing these steps.

The instructions on the computer-readable storage medium 1210 are read and stored in storage 1215 or in random access memory (RAM). The storage 1215 may provide a space for keeping static data where at least some instructions could be stored for later execution. The stored instructions may be further compiled to generate other representations of the instructions and dynamically stored in the RAM such as RAM 1220. The processor 1205 may read instructions from the RAM 1220 and perform actions as instructed.

The computer system may further include the output device 1225 to provide at least some of the results of the execution as output including, but not limited to, visual information to users, such as external agents. The output device 1225 may include a display on computing devices and virtual reality glasses. For example, the display may be a mobile phone screen or a laptop screen. GUIs and/or text may be presented as an output on the display screen. The computer system may further include an input device 1230 to provide a user or another device with mechanisms for entering data and/or otherwise interact with the computer system. The input device 1230 may include, for example, a keyboard, a keypad, a mouse, or a touchscreen. Each of these output device 1225 and input device 1230 may be joined by one or more additional peripherals. For example, the output device 1225 may be used to display results of the data extractor 130, the data lake 140, and the data analyzer 150.

A network communicator may be provided to connect the computer system to a network and in turn to other devices connected to the network including other clients, servers, data stores, and interfaces, for instance. A network communicator may include, for example, a network adapter such as a LAN adapter or a wireless adapter. The computer system may include a data sources interface 1240 to access the data source 1245. The data source 1245 may be an information resource. As an example, a database of exceptions and rules may be provided as the data source 1245. Moreover, knowledge repositories and curated data may be other examples of the data source 1245.

Figure 13:
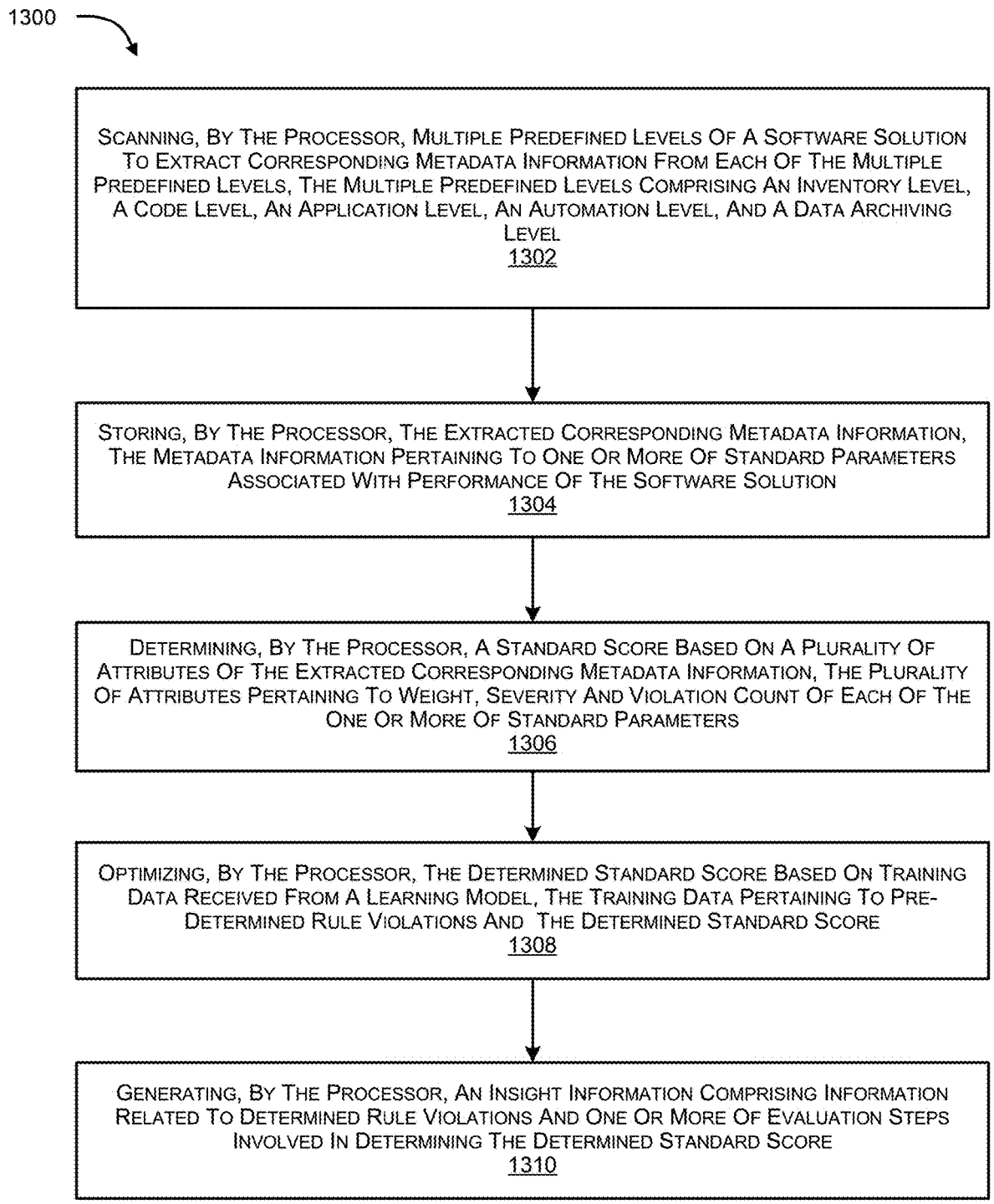
FIG. 13 illustrates a process flowchart for the system, according to an example embodiment of the present disclosure.

FIG. 13 illustrates a process flowchart for the system, according to an example embodiment of the present disclosure.

The order in which the method 1300 is described is not intended to be construed as a limitation, and any number of the described method blocks may be combined or otherwise performed in any order to implement the method 1300, or an alternate method. Additionally, individual blocks may be deleted from the method 1200 without departing from the spirit and scope of the present disclosure described herein. Furthermore, the method 1300 may be implemented in any suitable hardware, software, firmware, or combination thereof, that exists in the related art or that is later developed.

The method 1300 describes, without limitation, implementation of the system 100. A person of skill in the art will understand that the method 1300 may be modified appropriately for implementation in various manners without departing from the scope and spirit of the disclosure. The method 1300 may be implemented, in at least some embodiments, by the data analyzer 150 of the system 100. For example, the data analyzer 150 may use the processor(s) to execute computer instructions to perform operations for analyzing the determined metadata and thus creating insights related to performance optimization of the ERP solution.

At step 1302, multiple predefined levels of an Enterprise Resource Planning (ERP) solution may be scanned by data extractor 130, coupled to the processor(s), to extract corresponding metadata information from each of the multiple predefined levels. The multiple predefined levels may include an inventory level, a code level, an application level, an automation level, and a data archiving level.

At step 1304, a data lake 140 coupled to the processor may store the extracted corresponding metadata information. The metadata information may pertain to plurality of standard parameters associated with performance of the ERP solution. The data lake 140 may store a plurality of extraction results obtained from the data extractor 130. The plurality of extraction results may include the determined standard score and a plurality of standard rules pertaining to the performance of the ERP solution.

At step 1306, a data analyzer 150 coupled to the processor may determine a standard score based on a plurality of attributes of the extracted corresponding metadata information. The plurality of attributes may pertain to weight, severity and violation count of each of the plurality of standard parameters. At step 1308, the data analyzer 150 may optimize the determined standard score based on training data received from a learning model. The training data may pertain to pre-determined rule violations and the determined standard score. Further, at step 1310, the data analyzer 150 may generate an insight information comprising information related to determined rule violations and multiple evaluation steps involved in determining the determined standard score. In an embodiment, the data analyzer 150 may include a calculation engine 214, a predictive engine 220, and an analytical engine 226. The calculation engine 214 may evaluate the extracted corresponding metadata information and may perform calculations for determination of a standard score corresponding to a standard rule pertaining to the performance of the ERP solution. The calculation engine 214 may assign a severity score to the determined standard rule based on a predefined impact of the determined standard rule.

In an example embodiment, the predictive analytics may use an understanding of factors influencing past performance of the ERP solution to determine what could happen next and even what could be done to positively influence future outcomes. The predictive analytics may algorithmically analyze historical data to find trends and patterns to understand relationships between elements. By understanding these relationships, an entity may be in a position to take better decisions.

In an example embodiment, the AI driven predictive recommendations and Intelligent Interactive UI dashboards may be provided, where the AI driven predictive recommendations may be based on improving a standard score and the intelligent interactive UI dashboards may allow a user to simulate the standard score that may be achieved by reducing the violations powered by AI driven assisted recommendations.

Based on the received predictive analytics, the disclosure facilitates an automatic reconfiguration of an ERP system to achieve an improved ERP analytics system that has many of predictive-modeling steps automated and that performs complete predictive analytics workflow while requiring very little input from the client.

The present disclosure describes the system 100 as that may facilitate to improve performance optimization of a system. The extraction engine that includes various utilities may generate sustainable measures for overall improvement of the ERP system. The system 100 may facilitate the clients to obtain health related information of the ERP system and enable them to take proactive steps ahead for providing a sustainable solution. The system 100 may provide recommendations for inefficient programming practices followed in a custom code of the ERP solution, provide a list of unused custom inventory, unused business configurations, identify archiving/cleanup process for large sized custom and standard tables, identify CPU intensive and long running applications to get them scheduled in background, and provides recommendation for automation potential of repetitive manual tasks.

Additionally, the present disclosure may uniquely assist the client to utilize recommendations as received from data analytics of the system 100 for overall improvement of the ERP application. Further, the present disclosure may facilitate to provide a benchmark score that may be used to know performance health of the system and may be used to evaluate the ERP solution as per prevailing industry standards.

One of ordinary skill in the art will appreciate that techniques consistent with the present disclosure are applicable in other contexts as well without departing from the scope of the disclosure.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

We claim:

1. A system comprising:
    a processor;
    a data extractor coupled to the processor, the data extractor to:
        scan multiple predefined levels of a software solution to extract corresponding metadata information from each of the multiple predefined levels, the multiple predefined levels comprising an inventory level, a code level, an application level, an automation level, and a data archiving level;
    a data lake coupled to the processor, the data lake to:
        store the extracted corresponding metadata information, the metadata information pertaining to one or more of standard parameters associated with performance of the software solution;
    a data analyzer coupled to the processor, the data analyzer to:
        determine a standard score based on a plurality of attributes of the extracted corresponding metadata information, the plurality of attributes pertaining to weight, severity and violation count of each of the one or more of standard parameters;
        optimize the determined standard score based on training data received from a learning model, the training data pertaining to pre-determined rule violations and the determined standard score; and
        generate an insight information comprising information related to determined rule violations and one or more of evaluation steps involved in determining the determined standard score, wherein the data analyzer comprises a predictive engine, and the predictive engine is to:
        optimize and train the determined standard score and the one or more of standard parameters based on the training data received from the learning model, wherein the learning model is an Artificial Intelligent (AI)-based reinforcement learning (RL) model, wherein the AI-based RL model is to generate AI-driven predictions and interactive user interface dashboards, and wherein the AI-driven predictions comprise AI-driven predictive recommendations on software solutions benchmark improvements, and the interactive user interface dashboards comprise an interactive user interface allowing users to simulate an appropriate software solution benchmark by changing rules, violations and corrections suggested by the AI-driven predictive recommendations.

2. The system as claimed in claim 1, wherein the data lake coupled to the processor stores a plurality of extraction results obtained from the data extractor, the plurality of extraction results comprising the determined standard score and a plurality of standard rules pertaining to the performance of the software solution.

3. The system as claimed in claim 1, wherein the data analyzer comprises a calculation engine, and an analytical engine, wherein the calculation engine is to:
    evaluate the extracted corresponding metadata information and perform calculations for determination of a standard score corresponding to a standard rule pertaining to the performance of the software solution; and
    assign a severity score to the determined standard rule based on a predefined impact of the determined standard rule.

4. The system as claimed in claim 3, wherein the calculation engine of the data analyzer is to:
    determine the standard score using a sigmoid function, where the plurality of attributes pertaining to the weight, the severity and the violation count of each of the one or more of standard parameters are provided as input to the sigmoid function.

5. The system as claimed in claim 3, wherein the analytical engine of the data analyzer is to:
    display and present the generated insight information on interactive analytical dashboards along with a detailed report of the determined rule violations and determined rule success, where the interactive analytical dashboards are presented on the computing device associated with the client.

6. The system as claimed in claim 3, wherein the reinforcement model interacts with the calculation engine and the analytical engine to predict the standard score by receiving dynamic inputs from the client, where the dynamic inputs are received from the client through the interactive analytical dashboards.

7. The system as claimed in claim 1, wherein the AI-based reinforcement model uses an optimization technique to optimize the determined standard score and predicts reductions to the determined rule violations.

8. The system as claimed in claim 1, wherein the data extractor is to:
    extract the metadata information from each of the multiple predefined levels by either configuring the data extractor in the computing device executing the software solution or by receiving the determined one or more of standard parameters in a predefined format from the computing device associated with the client.

9. A method comprising:
    scanning, by a processor, multiple predefined levels of a software solution to extract corresponding metadata information from each of the multiple predefined levels, the multiple predefined levels comprising an inventory level, a code level, an application level, an automation level, and a data archiving level;
    storing, by the processor, the extracted corresponding metadata information, the metadata information pertaining to one or more of standard parameters associated with performance of the software solution;
    determining, by the processor, a standard score based on a plurality of attributes of the extracted corresponding metadata information, the plurality of attributes pertaining to weight, severity and violation count of each of the one or more of standard parameters;
    optimizing, by the processor, the determined standard score based on training data received from a learning model, the training data pertaining to pre-determined rule violations and the determined standard score; and generating, by the processor, an insight information comprising information related to determined rule violations and one or more of evaluation steps involved in determining the determined standard score, wherein the data analyzer comprises a predictive engine, and the predictive engine is to:

optimize and train the determined standard score and the one or more of standard parameters based on the training data received from the learning model, wherein the learning model is an Artificial Intelligent (AI)-based reinforcement learning (RL) model, wherein the AI-based RL model is to generate AI-driven predictions and interactive user interface dashboards, and wherein the AI-driven predictions comprise AI-driven predictive recommendations on software solutions benchmark improvements, and the interactive user interface dashboards comprise an interactive user interface allowing users to simulate an appropriate software solution benchmark by changing rules, violations and corrections suggested by the AI-driven predictive recommendations.

10. The method as claimed in claim 9, wherein the data lake coupled to the processor stores a plurality of extraction results obtained from the data extractor, the plurality of extraction results comprising the determined standard score and a plurality of standard rules pertaining to the performance of the software solution.

11. The method as claimed in claim 9, further comprising:
evaluating, at the processor, the extracted corresponding metadata information and perform calculations for determination of a standard score corresponding to a standard rule pertaining to the performance of the software solution; and
assigning, at the processor, a severity score to the determined a standard rule based on a predefined impact of the determined standard rule.

12. The method as claimed in claim 11, further comprising:
determining, at the processor, the standard score using a sigmoid function, where the plurality of attributes pertaining to the weight, the severity and the violation count of each of the one or more of standard parameters are provided as input to the sigmoid function.

13. The method as claimed in claim 11, further comprising:
displaying and presenting, at the processor, the generated insight information on interactive analytical dashboards along with a detailed report of the determined rule violations and determined rule success, where the interactive analytical dashboards are presented on the computing device associated with the client.

14. The method as claimed in claim 11, wherein the reinforcement model interacts with the calculation engine and the analytical engine to predict the standard score by receiving dynamic inputs from the client, where the dynamic inputs are received from the client through the interactive analytical dashboards.

15. The method as claimed in claim 9, wherein the AI-based reinforcement model uses an optimization technique to optimize the determined standard score and predicts reductions to the determined rule violations.

16. The method as claimed in claim 9, further comprising:
extracting, at the processor, the metadata information from each of the multiple predefined levels by either configuring the data extractor in the computing device executing the software solution or by receiving the determined one or more of standard parameters in a predefined format from the computing device associated with the client.

17. A non-transitory computer readable medium comprising machine executable instructions that are executable by a processor to:

scan multiple predefined levels of a software solution to extract corresponding metadata information from each of the multiple predefined levels, the multiple predefined levels comprising an inventory level, a code level, an application level, an automation level, and a data archiving level;

store the extracted corresponding metadata information, the metadata information pertaining to one or more of standard parameters associated with performance of the software solution;

determine a standard score based on a plurality of attributes of the extracted corresponding metadata information, the plurality of attributes pertaining to weight, severity and violation count of each of the one or more of standard parameters;

optimize the determined standard score based on training data received from a learning model, the training data pertaining to pre-determined rule violations and the determined standard score; and generate an insight information comprising information related to determined rule violations and one or more of evaluation steps involved in determining the determined standard score, wherein the data analyzer comprises a predictive engine, and the predictive engine is to:

optimize and train the determined standard score and the one or more of standard parameters based on the training data received from the learning model, wherein the learning model is an Artificial Intelligent (AI)-based reinforcement learning (RL) model, wherein the AI-based RL model is to generate AI-driven predictions and interactive user interface dashboards, and wherein the AI-driven predictions comprise AI-driven predictive recommendations on software solutions benchmark improvements, and the interactive user interface dashboards comprise an interactive user interface allowing users to simulate an appropriate software solution benchmark by changing rules, violations and corrections suggested by the AI-driven predictive recommendations.

18. The non-transitory computer readable medium as claimed in claim 17, wherein the data lake coupled to the processor stores a plurality of extraction results obtained from the data extractor, the plurality of extraction results comprising the determined standard score and a plurality of standard rules pertaining to the performance of the software solution.

* * * * *